United States Patent [19]

Morita et al.

[11] Patent Number: 5,361,329
[45] Date of Patent: Nov. 1, 1994

[54] DATA PROCESSING APPARATUS

[75] Inventors: Tetsuya Morita, Kawasaki; Hiroshi Yamano; Yukio Isaka, both of Yokohama; Haruo Ishizuka, Tokyo; Masahiko Murata, Tama; Masahiko Sakai, Kawasaki; Tsutomu Kubota, Tokyo, all of Japan

[73] Assignee: Canon Kabushiki Kaisha, Tokyo, Japan

[21] Appl. No.: 74,013

[22] Filed: Jun. 9, 1993

Related U.S. Application Data

[63] Continuation of Ser. No. 749,520, Aug. 19, 1991, abandoned, which is a continuation of Ser. No. 392,036, Aug. 9, 1989, abandoned.

[30] Foreign Application Priority Data

| Aug. 11, 1988 | [JP] | Japan | 63-198921 |
| Sep. 16, 1988 | [JP] | Japan | 63-229725 |
| Dec. 1, 1988 | [JP] | Japan | 63-304661 |
| Dec. 16, 1988 | [JP] | Japan | 63-316500 |
| Jan. 9, 1989 | [JP] | Japan | 1-001230 |
| Jan. 10, 1989 | [JP] | Japan | 1-002141 |
| Jan. 24, 1989 | [JP] | Japan | 1-013095 |

[51] Int. Cl.⁵ .............................................. G06F 15/00
[52] U.S. Cl. ..................................... 395/102; 395/107
[58] Field of Search ............... 395/101, 102, 107, 109, 395/111, 115, 116, 162–164, 112; 358/296, 298, 451; 355/55, 56; 346/154

[56] References Cited

U.S. PATENT DOCUMENTS

| 4,517,578 | 5/1985 | Tazaki | 364/518 |
| 4,578,689 | 3/1986 | Spencer et al. | 346/154 |
| 4,647,189 | 3/1987 | Fujiwara et al. | 355/55 |
| 4,741,635 | 5/1988 | Shabata et al. | 340/731 |
| 4,742,363 | 5/1988 | Shiroishi | 346/296 |
| 4,768,043 | 8/1988 | Saito et al. | 358/298 |
| 4,811,249 | 3/1989 | Marsh | 395/101 |
| 4,816,924 | 3/1989 | Sekiya | 358/296 |
| 4,860,119 | 8/1989 | Maniwa et al. | 358/296 |
| 4,862,288 | 8/1989 | Sekiya | 358/296 |
| 4,862,289 | 8/1989 | Shimada | 358/296 |
| 4,964,070 | 10/1990 | Markoff et al. | 395/102 |
| 4,965,590 | 10/1990 | Yamazak | 395/102 |
| 4,965,871 | 10/1990 | Ogura et al. | 355/55 |

FOREIGN PATENT DOCUMENTS

| 56-82284A | 4/1981 | Japan | 346/76 PA |
| 63-249663 | 10/1988 | Japan | 395/101 |

*Primary Examiner*—Arthur G. Evans
*Attorney, Agent, or Firm*—Fitzpatrick, Cella, Harper & Scinto

[57] ABSTRACT

There is disclosed a data processing apparatus capable of providing a desired output print regardless of the size of print data by modifying the density of the print. For this purpose there is provided a processing unit for determining the print density based on data associated with the printing medium used in a printing unit.

8 Claims, 27 Drawing Sheets

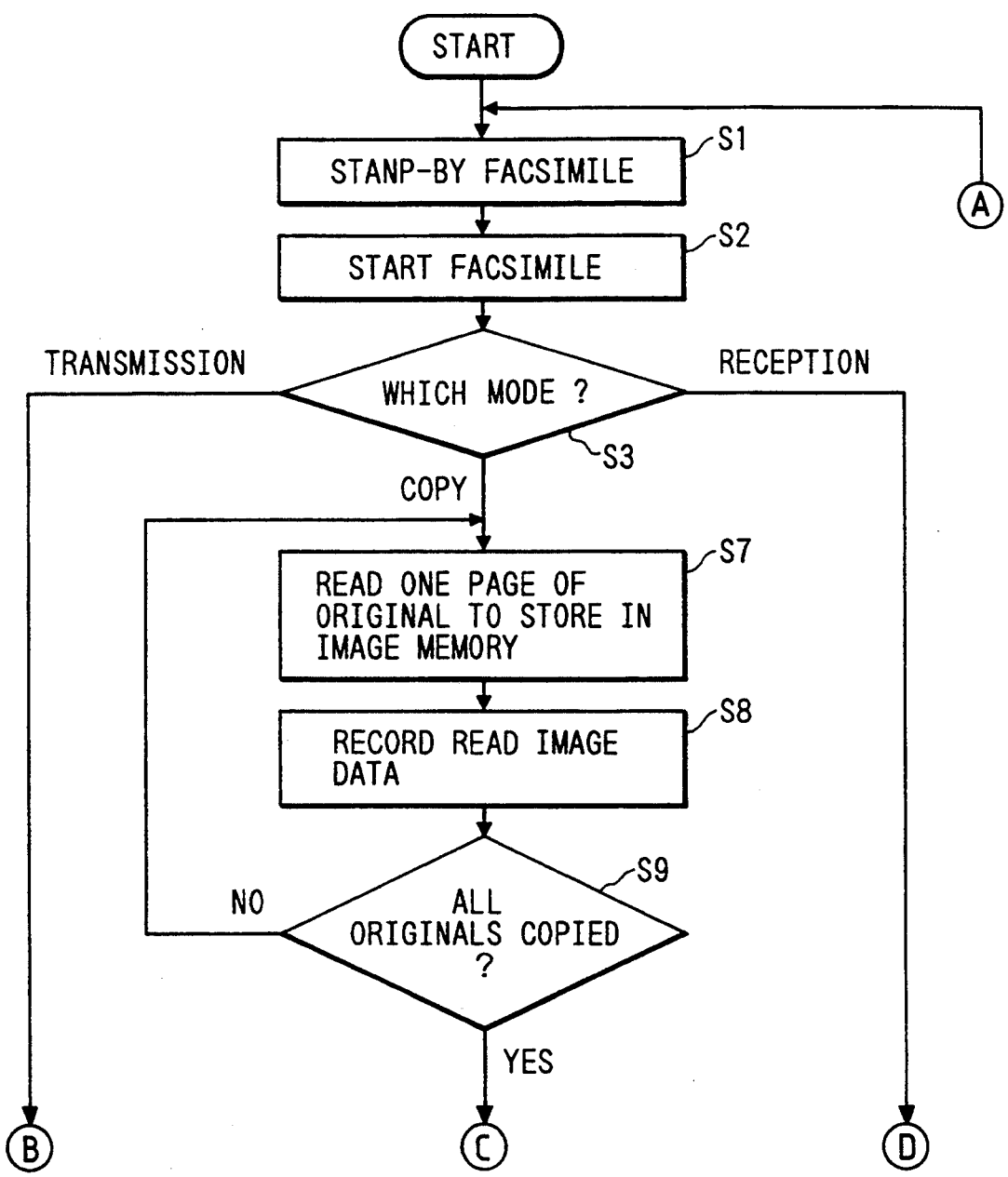

DATA PROCESSING APPARATUS

This application is a continuation of application Ser. No. 07/749,520 filed Aug. 19, 1991, now abandoned, which was a continuation of application Ser. No. 07/392,036 filed Aug. 9, 1989, now abandoned.

BACKGROUND OF THE INVENTION

1. Field of the Invention

The present invention relates to a data processing apparatus for processing data relating to image output.

2. Related Background Art

A typical example of output apparatus equipped with data processing apparatus is a laser beam printer. In such laser beam printer, image data based on input print data (image data or character codes) are developed in succession in an internal image memory.

If the data are entered overflowing the area of the printing medium (printing sheet) in such image data development, such overflowing data are normally discarded or developed in a succeeding print medium.

Thus, the output result intended by the operator cannot be obtained when such overflowing part is present.

In order to avoid such situation, it becomes necessary to process or edit such print data in the data source (host computer) so that said data can be accommodated within the printing medium, but such processing after the data are once prepared or edited is cumbersome and inefficient.

Also in such conventional apparatus, character patterns are generated corresponding to character codes, by analyzing the control code data (command codes) in the print data from the host computer or the like and referring to a character font ROM incorporated in the apparatus or connected thereto, based on the kind, style and size of the character. The character patterns thus obtained are developed for example in corresponding positions of a bit map memory for printing. However, in case of enlarged or reduced printing of a page, the character size and printing pitch in the print command supplied from the host computer have to be varied. Thus the host computer has to supply different command data to the printing unit by re-editing the output, and the burden to the operator is significant.

Also if the editing software of the host computer has fixed size and pitch of the characters and is unable to select said size or pitch, the enlargement or reduction of each page has been not possible.

As explained above, the printing apparatus executes printing operation by receiving character codes from an external host computer (including a word processor a personal computer) and generating character patterns by a character font ROM provided in said apparatus.

Particularly in case of a page printer for receiving and printing the print data in the unit of a page, character patterns corresponding to the input character codes are developed, in the unit of a page, on the memory according to the instructed print position, style, size, character pitch and line pitch, then edited and printed by a printing mechanism.

However, even if the print data from the host computer are not final and merely for the confirmation of content, it is necessary to follow the same printing procedure.

For example if the data to be printed are a program list under development and subject to changes and are large in quantity, the printing of all these data on successive pages not only leads to the waste of printing sheets but also the time required for the entire printing.

Also in the above-mentioned page printers for editing the print data supplied from a data source such as a host computer into a page and printing said print data, there is already known a laser beam printer in which a laser beam modulated by the print data such as characters or image data is directed to a polygon mirror rotating at a high speed and an electrostatic latent image is thereby formed on a photosensitive member.

However, in certain page printers, the effective printing area is determined in advance, and the printer calculates the number of characters printed in the horizontal direction so as to effect the printing in a range corresponding to the sizes (B4, A4) of the printing sheet. Thus, if the input print data contain a number of characters exceeding the above-mentioned calculated number of characters, the printing can only be made up to the A4-size even if said print data instruct the printing on a B4-sized sheet. In such printers, there may result a drawback that the obtained print lacks a part of the print data.

Also in such conventional printing apparatus, the printing operation is often not conducted if the quantity of the received print data is large, for example because said data overflows the printing sheet. In such case, there is usually given, from the data source, an instruction for printing with smaller characters, in order to increase the number of characters per unit area thereby accommodating the print data within the desired printing sheet.

However, in such case, the operator is required to conduct cumbersome operations of selecting the character pitch and line pitch.

Also the use of smaller characters may result in more blinded print then anticipated.

Furthermore, the above-mentioned page printers are so designed as to print, with high quality, the print data containing characters and images, prepared by image editing achieved in so-called desktop publishing.

It is also possible to print text data with a desired size, by suitably selecting character patterns of different dot numbers stored in the apparatus in advance.

However, if the sheets of a size designated by the host computer are not loaded in the apparatus, the printing operation is interrupted by terminating the data reception after a command designating said sheet size.

In such case, therefore, it is necessary to vary the format of the print data in the host computer, or to replace the printing sheets loaded in the printing apparatus.

Furthermore, an assignee of the present application has some patents associated with various data processing apparatus, for example, the U.S. Pat. Nos. 4,059,833, 4,107,786, 4,393,387, 4,686,525 and 4,715,006, but further improvements have been longed for.

SUMMARY OF THE INVENTION

An object of the present invention is to eliminate the above-explained drawbacks of the prior technology.

Another object of the present invention is to provide an improvement on the data processing apparatus.

Still another object of the present invention is to provide a data processing apparatus with improved performance.

Still another object of the present invention is to provide a data processing apparatus capable of data processing so as to obtain a desired output.

Still another object of the present invention is to provide a data processing apparatus capable of reducing the burden on the operator.

Still another object of the present invention is to provide a data processing apparatus capable of providing an intended output regardless of the size of the print data.

Still another object of the present invention is to provide a data processing apparatus capable of size variation of the image data according to the necessity.

Still another object of the present invention is to provide a data processing apparatus enabling enlarged or reduced printing without change in the print data.

Still another object of the present invention is to provide a data processing apparatus capable of variation in the recording density.

Still another object of the present invention is to provide a data processing apparatus capable of printing print data of plural pages on a printing medium.

Still another object of the present invention is to provide a data processing apparatus capable of printing necessary information without lack therein and without deterioration in quality.

Still another object of the present invention is to provide a data processing apparatus capable of varying the recording density according to the necessity.

Still another object of the present invention is to provide a data processing apparatus capable of selecting the recording density according to the size of the recording medium.

Still another object of the present invention is to provide a data processing apparatus capable of providing a reproduced output of high quality without being influenced by the amount of data.

Still another object of the present invention is to provide a data processing apparatus capable of formation of a desired image on a recording medium loaded in the apparatus, even if the size thereof is different from the designated size of the recording medium.

Still another object of the present invention is to provide a data processing apparatus capable of image output without deterioration in quality.

Still another object of the present invention is to provide a data processing apparatus capable of reproducing a desired image even when the size of the original image is different from that of the recording medium.

Still other objects of the present invention, and the advantages thereof, will become fully apparent from the following description, to be taken in conjunction with the attached drawings, and from the appended claims.

BRIEF DESCRIPTION OF THE DRAWINGS

FIGS. 24, 24A and 24B are a flow chart of the control sequence of the facsimile apparatus shown in FIG. 23;

DETAILED DESCRIPTION OF THE PREFERRED EMBODIMENT

Now the present invention will be clarified in detail by embodiments thereof shown in the attached drawings.

1ST EMBODIMENT

Figure 1:
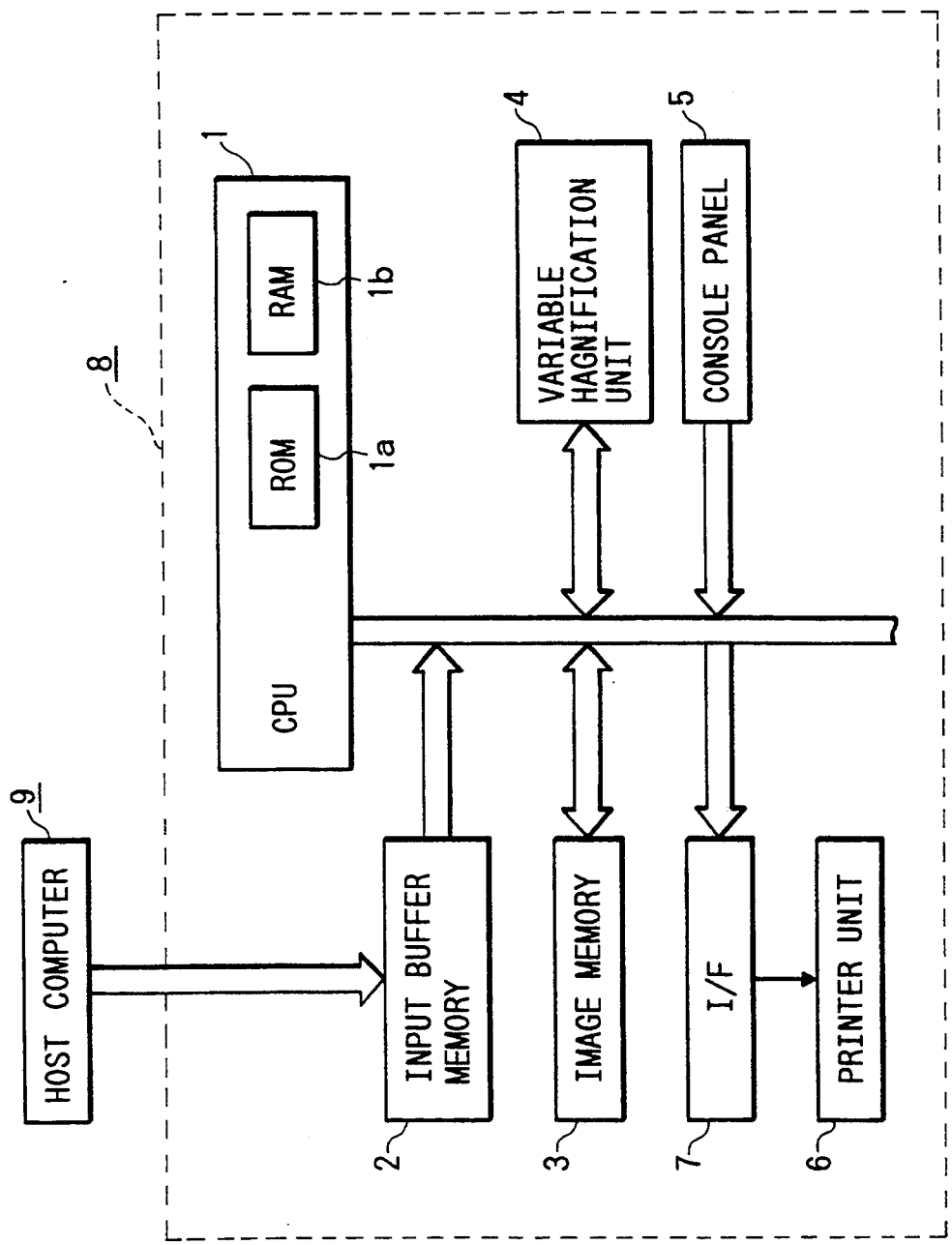
FIG. 1 is a block diagram of a printing apparatus constituting a first embodiment.

Structure (FIG. 1)

FIG. 1 shows the structure of a printing apparatus 8 of the 1st embodiment, and its relation to a host computer 9 constituting a data source. In the present embodiment, the printing apparatus 8 of the present embodiment serves for forming an output image on a recording sheet by receiving image data.

Figure 2:
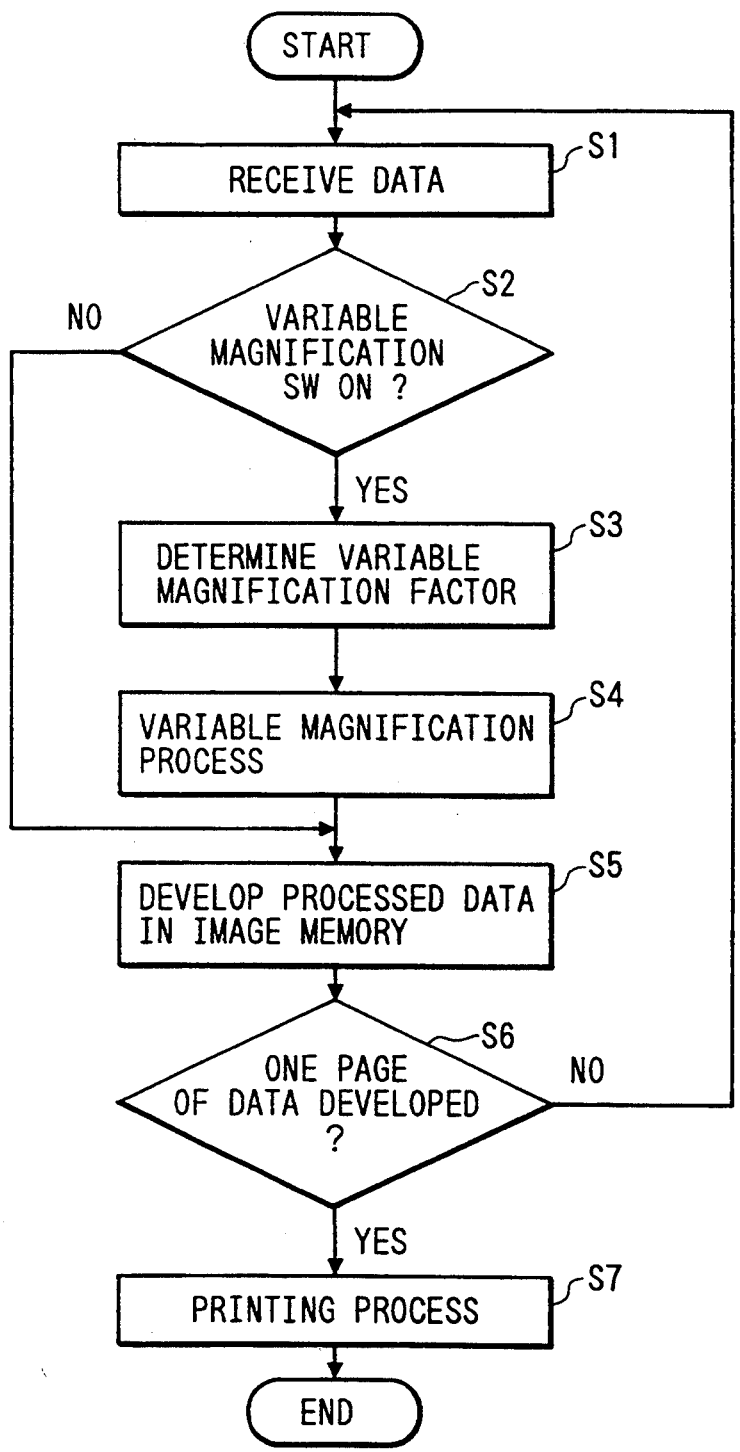
FIG. 2 is a flow chart of the function of said first embodiment.

A CPU 1 for controlling the entire printing apparatus is provided with a ROM 1a storing a program corresponding to the flow chart shown in FIG. 2, and a RAM 1b used as a work area. There are also provided an input buffer memory (including input interface) 2 for storing image data of a line supplied from the host computer 9; an image memory 3 in which image data of a page, corresponding to the output image, can be developed; a variable magnification unit 4 for performing the variable magnification process of the image data under the control of the CPU 1; a console panel 5 provided on the outer surface of the apparatus for entering various instructions and containing a magnification varying switch to be explained later; a printer unit (laser beam printer) 6 for forming an image corresponding to the data developed in the image memory 3; and an interface (I/F) 7 for supplying said printer unit 6 with data.

The variable magnification process in the variable magnification unit 4 is conducted in already known data thining or interpolation and will not, therefore, be explained.

Outline of Processing (FIG. 2)

The printer unit 6 of the present embodiment is composed of a laser beam printer, in which the entire number of dots in the lateral direction is known for each sheet size.

It is now assumed that the printing apparatus 8 of the present embodiment contains a cassette in which A4-sized printing sheets are stored in vertically oblong position, that the total number of dots of the image forming area in the lateral direction is assumed to be $W_0$, and that the sheet size of the loaded cassette is automatically detected by the CPU 1 through a sensor (not shown).

There will be no problem in the printing operation in case of $W_1 \leq W_0$, wherein $W_1$ is the number of pixels of image data in a line, supplied from the host computer 9, but, in case of $W_1 > W_0$, the overflowing portion will be discarded.

In the present embodiment, therefore, when the variable magnification switch on the console panel 5 is turned on in the state $W_1 > W_0$, the input image data are subjected to variable magnification process so as to bring the number of pixels to $W_0$. This operation avoids the discarding of the overflowing portion of the print data supplied from the host computer 9 to the printing apparatus 8.

For this purpose the CPU 1 of the present embodiment executes a control sequence shown in FIG. 2.

At first a step S1 receives the image data of a line and stores said data in the input buffer memory 2. Then a step S2 discriminates whether the variable magnification switch on the console panel 5 is turned on or off. If it is identified off, the sequence proceeds to a step S5 for developing the input image data directly in the image memory 3. On the other hand, if said switch is off, the sequence proceeds to a step S3 to determine the variable magnification factor, based on the size of sheet set in the apparatus and the number of pixels of input image data of a line, so as that the image can be accommodated in said sheet size. Then a next step S4 variable-magnifies the input image data with said factor, and a step S5 develops the variable-magnified image data in the image memory 3.

The above-explained sequence starting from the step S1 is repeated until a step S6 discriminates that the development of image data of a page is completed in the image memory 3. When said development is completed, the image data developed in the image memory 3 are supplied to the printer unit 6 to form the output image.

In the above-explained sequence, the discrimination of the step S2 and the determination of variable magnification factor in the step S3 are executed only at the input of data of the first line in a page, and the reception of line data for the 2nd and subsequent lines and the development thereof in the image memory 3 are executed according to the initial branching discrimination and variable magnification fastor.

As explained in the foregoing, the present embodiment allows to obtain an entire image intended by the operator on the printing medium, regardless of the size of the image based on the input data.

Also in the present embodiment the input data are assumed to be image data, but it is not limited to such image data because character codes can be processed similarly if a character font ROM is provided.

Also in the foregoing there has been explained the variable magnification of the image data only in the lateral direction of the printing sheet, it is also possible to accommodate the vertically overflowing portion in the printing sheet, by developing the input image data in the image memory 3 of a sufficiently large capacity, then performing the variable magnification of the image in the vertical and lateral directions by the variable magnification unit 4, and sending thus processed data to the printer unit 6.

Also in the present embodiment, a laser beam printer is employed as the printer unit, but the present invention is not limited to such printer and is directly applicable to other printers.

2ND EMBODIMENT

Figure 3:
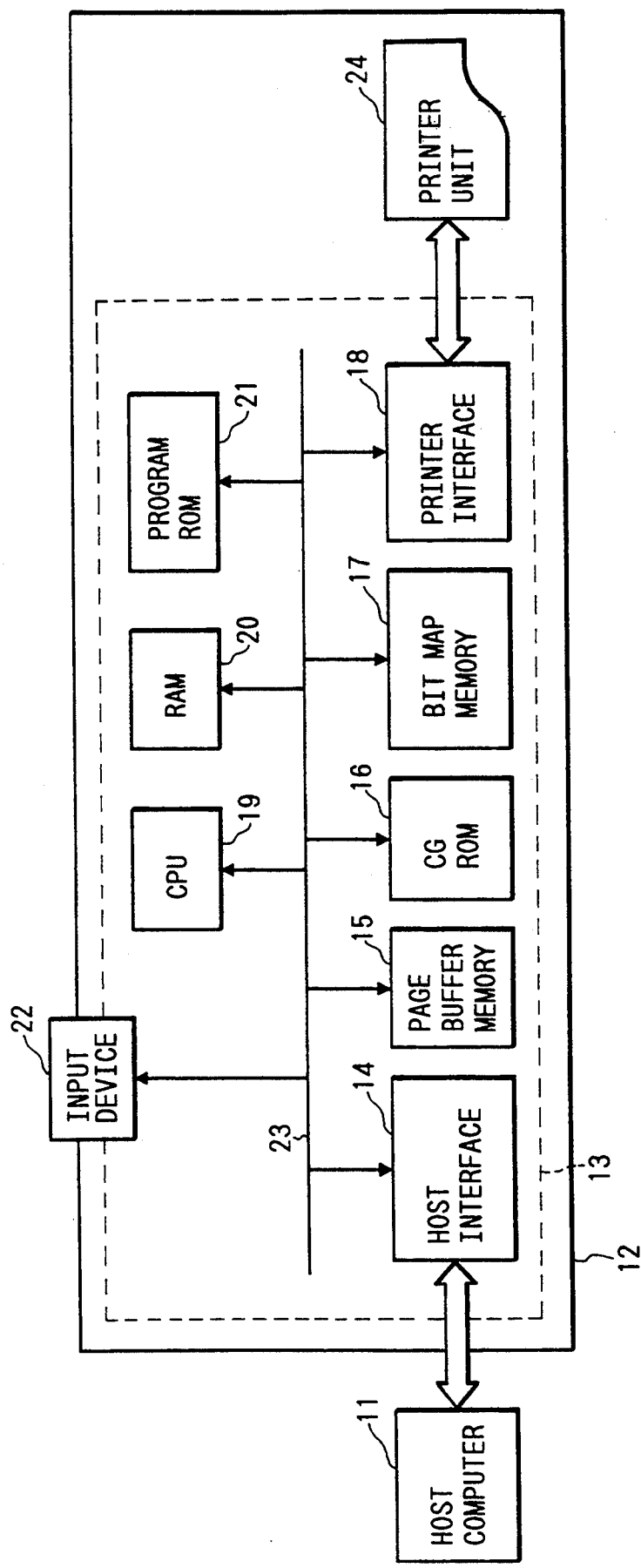
FIG. 3 is a block diagram of a printer unit in a second embodiment.
Figure 4:
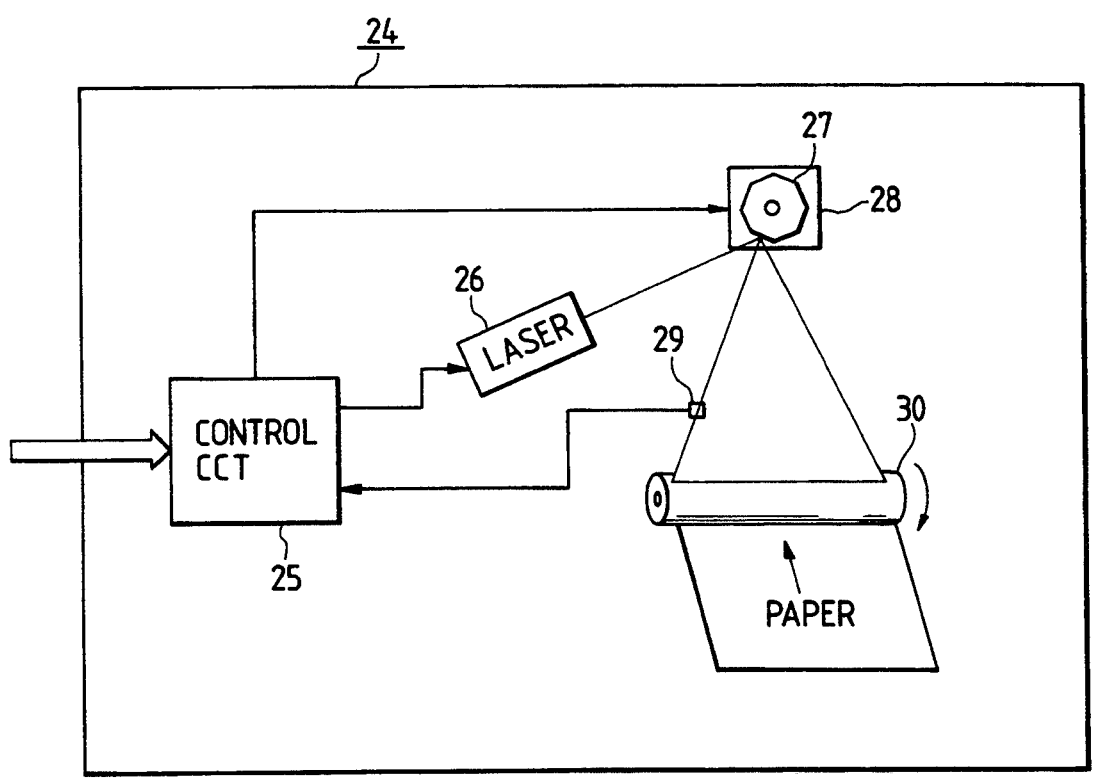
FIG. 4 is a schematic view of the structure of the printer unit.

Structure (FIGS. 3 and 4)

FIG. 3 illustrates the structure of a second embodiment, wherein provided are a host computer 11 for supplying print data, and a printing apparatus 12 constituting the second embodiment and composed of a print control unit 13 for processing the print data and a printer unit 24 for effecting the printing operation.

Figure 7:
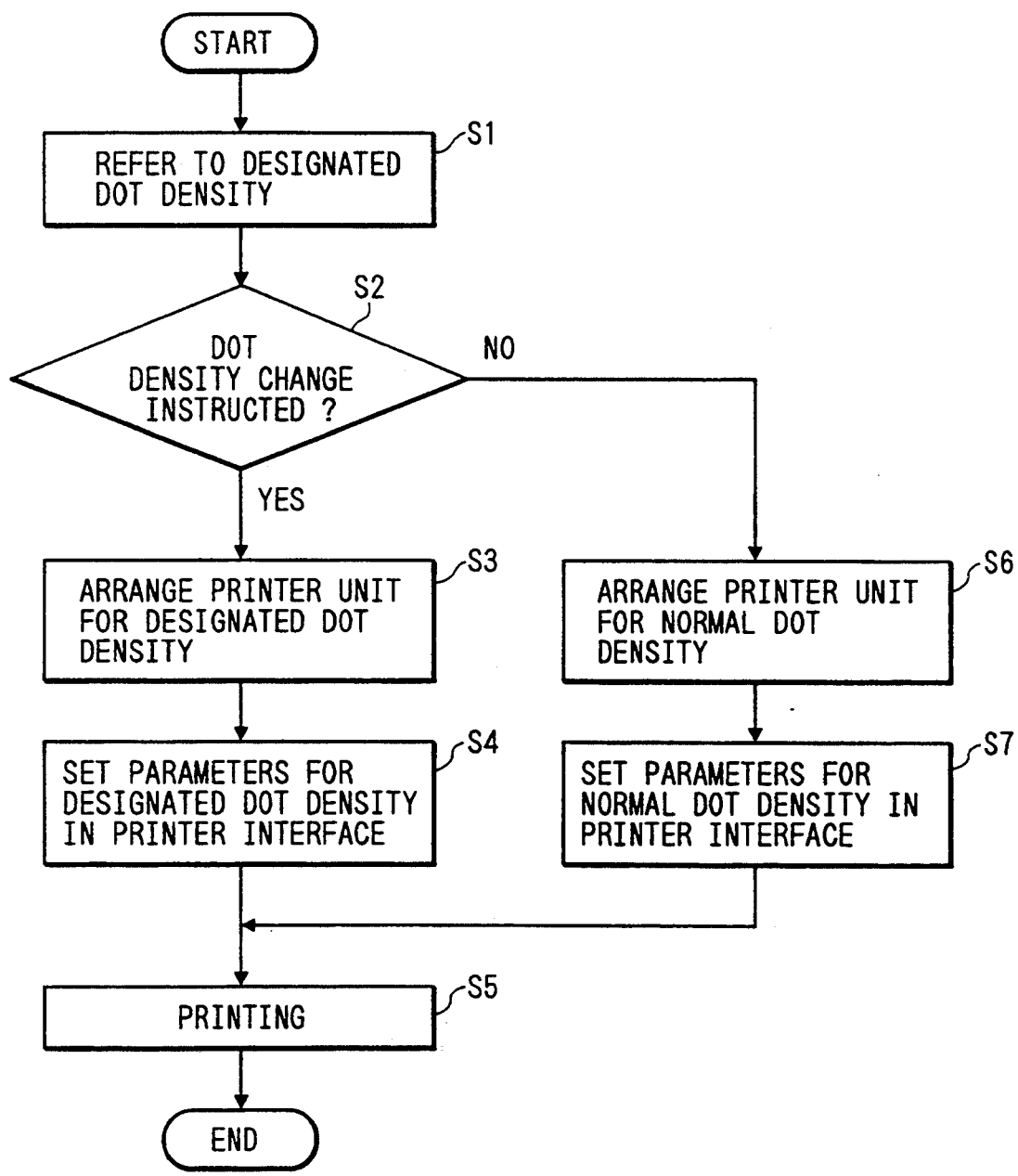
FIG. 7 is a flow chart of the control sequence of a CPU in the second embodiment.

There are further provided a host interface 14 for reception control for the data from the host computer 11; a page buffer memory 15 for storing the received print data and for page editing therefor; a CGROM 16 storing dot matrix character patterns corresponding to data codes; a bit map memory 17 constituting an image memory in which the print data are to be developed as dot data; a printer interface 18 for serial output of the data from the bit map memory 17 to a printer unit 24 and for controlling said printer unit 24; a CPU 19 for controlling various devices, data transfer, page editing and dot data development in the print control unit 13; a RAM 20 used as the work area of the CPU 19; a program ROM 21 storing a program of the CPU 19, corresponding to the flow chart shown in FIG. 7; a console panel 22 for entering commands for the printing apparatus; and a system bus 23 mutually connecting the various components of the print control unit 13.

FIG. 4 schematically shows the structure of the printer unit 24, in which provided are a control circuit 25 for sequence control of the entire printer unit 24; a laser unit 26 for generating a laser beam in response to a signal from the control circuit 25, modulated by the print data; a polygon mirror 27 for reflecting the laser beam from the laser unit 26 for causing a scanning motion on a photosensitive drum 30; a motor 28 for rotating the polygon mirror 27 in one of several different speeds or in a continuously varying speed under the control of the control circuit 25, based on the instruction of the CPU 19 of the print control unit; and a beam detector 29 for detecting the timing of laser beam scanning and generating a horizontal synchronization signal.

Outline of Printing Operation

The printing operation of the above-explained 2nd embodiment is executed as follows.

In the ordinary printing operation, the CPU 19 receives the print command data from the host computer 11 through the host interface 14, and stores said data in the page buffer memory 15. At the same time the CPU 19 reads the stored data, and, if said read data are a control code, analyzes the command, thereby editing print data of a page in a designated format in the page buffer memory 15. Also the CPU 19 reads, in succession, the print data of already edited page, selecting suitable font in the CGROM 16 according to the designated style and size to generate character patterns corresponding to the character codes after editing, and develops said character patterns in the bit map memory 17, whereby print dot data are generated therein. Upon completion of the development of character patterns of a predetermined number of lines from the top of the page, the CPU 19 controls the printer interface 18 to send control signals such as a print start signal and a vertical synchronization signal to the printer unit 24, thereby activating said printer unit 24, and transfers the print data from the bit map memory 17 to an internal data buffer of the printer interface 18, which sends thus transferred print data in the form of serial data and in synchronization with the horizontal synchronization signal sent to the printer unit 24, to said printer unit 24.

The above-mentioned predetermined number of lines corresponds to the number of lines in one of several blocks into which a page is divided, or the number of lines in a page. In the former, while a block is printed by the printer unit 24 through the printer interface 18, the print data development is conducted in the next block so as to be in time for the printing of said block. In the latter, the printing is started after the print data of a page are developed on the bit map memory. The latter method is employed in the present embodiment, but the former method can also be employed likewise.

The above-explained process covers the ordinary printing operation, but the second embodiment is capable of printing with several printing density, by sending a print dot density selecting command from the printer interface 18 to the printer unit 24.

When the control circuit 25 in the printer unit 24 receives said command through the printer interface 18, said control circuit controls the motor 28 so as to rotate the polygon mirror 27 at a speed corresponding to the selected dot density. If the advancing speed of printing sheets, or the number of sheet outputs per unit time, is constant, an increased revolution of the polygon mirror 27 increases the number of scanning lines per page, thus elevating the dot density in the sub scanning direction. On the other hand the dot density in the main scanning direction becomes lower if the image clock signals from the printer interface are constant, because the scanning motion by the polygon mirror becomes faster. The dot density can be elevated by maintaining the rate of the image clock signals of the printer interface 18 higher than those of a clock generator 36 shown in FIG. 5. Thus a reduction printing is achieved. Also it is possible to reduce the dot density, by reducing the revolution of the polygon mirror 27 and also reducing the rate of the image clock signals. Thus an enlarged printing is achieved.

In this manner it is made possible to vary the dot density of characters in each page, thereby achieving enlarged or reduced printing.

It is to be noted that the development of character patterns in the bit map memory 17 can be made as in the ordinary printing, irrespective of the dot density.

In the present embodiment, the dot density can be designated from the console panel 22, so that the operator can arbitrarily vary the dot density.

Figure 5:
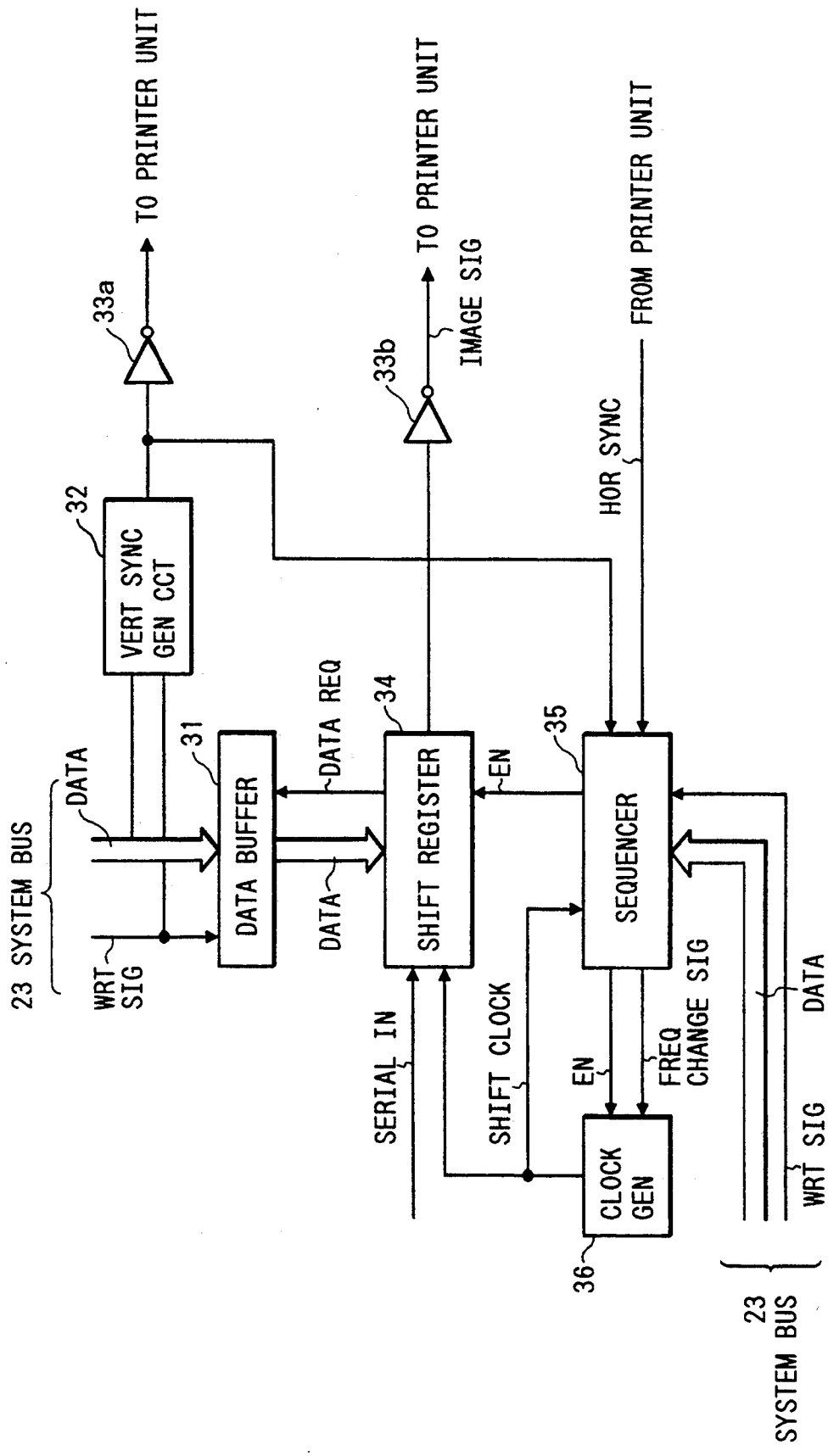
FIG. 5 is a block diagram of a printer interface.
Figure 6:
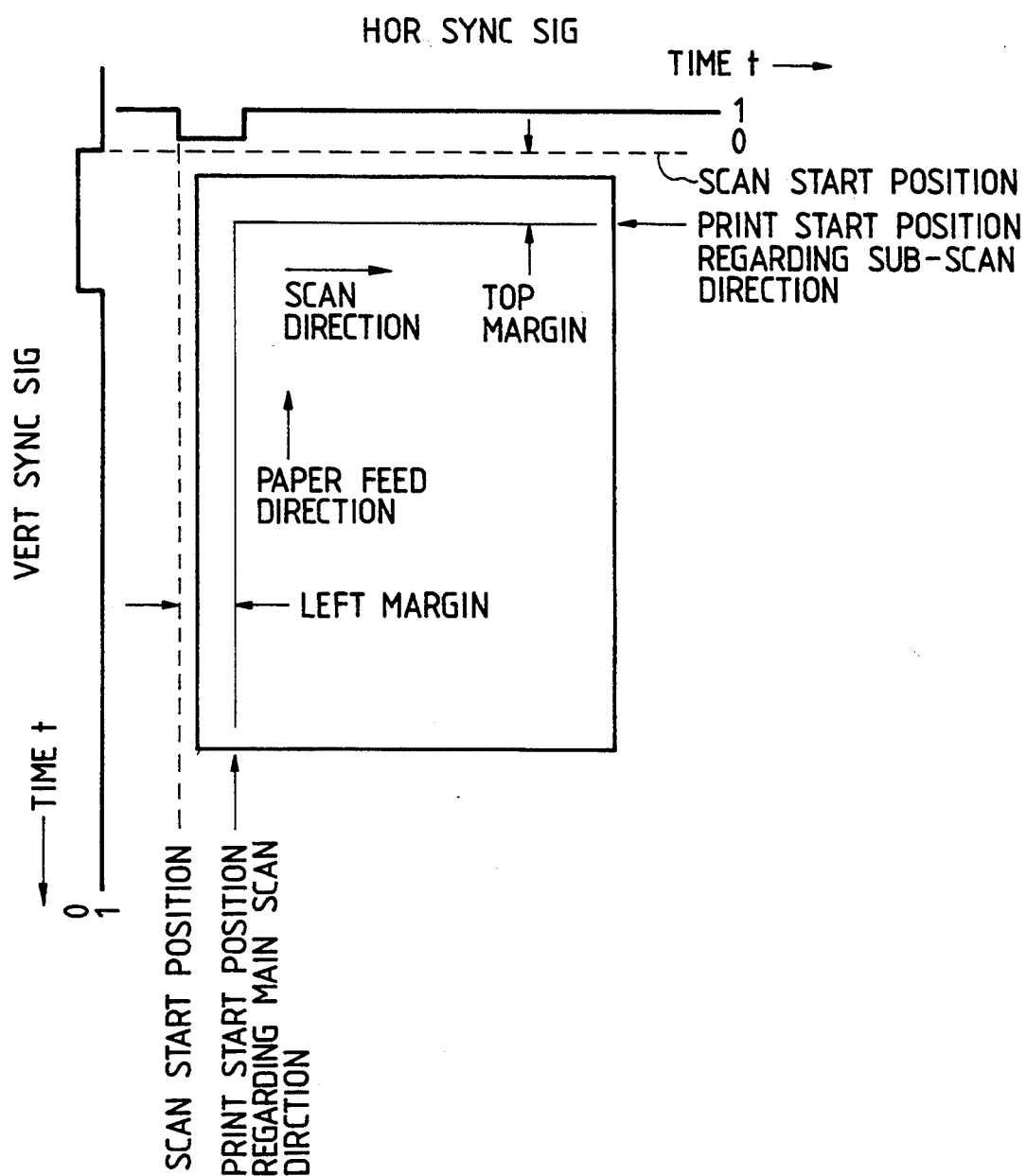
FIG. 6 is a view showing the relation between a synchronization signal and print positions.

Print Position Control (FIGS. 5 and 6)

In the following there will be explained the control on the print position.

FIG. 5 is a block diagram of the printer interface 18 in the print control unit 13, wherein provided are a data buffer 31 for temporarily storing print data (pixel data); a vertical synchronization signal generating circuit 32; a driver 33a for sending the vertical synchronization signal to the printer unit 24; a shift register 34 for converting parallel image data into serial data; a sequencer 35 for controlling the timing of data transfer to the printer unit 24; and a clock generator 36 for generating image clock signals. The frequency of the image clock signals can be varied by an image clock varying signal generated from the sequencer 35 in response to a command from the CPU.

FIG. 6 illustrates the relation among the vertical and horizontal synchronization signals, output timing of print data and print position on the sheet.

In the following there will be explained the control on the print position, with reference to FIGS. 5 and 6.

The CPU 19 sets parameters for print control in the sequencer 35 through the data bus. Said parameters are to control the timing of print data output. Among said parameters, "top margin" indicates the number of scanning lines from the vertical synchronization signal to the print start position in the sub scanning direction, and the print data are not released during said top margin. "Left margin" indicates the number of output dots from the horizontal synchronization signal to the print start position in the main scanning direction, and the print data are not released during said left margin. In these margins, the print data are not supplied from the data buffer 31 as described above, but in fact "white" data are supplied to the printer unit 24. The frequency of the image clock signals from the clock generator 36 is that is the bit switching frequency of the shift register 34 at the image signal output therefrom.

After the setting of these parameters, the CPU 19 transfers a first block of the print data from the bit map memory 17, through the system bus 23, to the data buffer 31. Thus the vertical synchronization signal is sent from the generator circuit 32 to the printer unit 24. Said vertical synchronization signal has a form shown in FIG. 6, and the synchronizing position is at the downshift from the logic level "1" to "0". In synchronization therewith, the printer unit 24 starts the sheet transfer and the output of the horizontal synchronization signal, which has the synchronizing position at the downshift from the logic level "1" to "0". At said position the sequencer 35 is activated, counts the horizontal synchronization signal released from the printer unit 24, and sends a signal to the shift register 34 for releasing white data until the number of lines of the preset top margin is reached. Upon reception of the horizontal synchronization signal after the top margin, the sequencer 35 counts the clock signals corresponding to the left margin, and then causes the data buffer 31 to start loading of the image data into the shift register 34.

Thereafter the clock generator 36 is activated in synchronization with the horizontal synchronization signal. The sequencer 35 counts the dots (pixel clock signals) of the left margin, and thereafter enables the shift register 34 to start the output of the print data. After the output of all the image data from the shift register 34, succeeding data are loaded from the data buffer 31 into the shift register 34. Also the CPU 19 continuously transfer the data from the bit map memory 17 to the data buffer 31. Thereafter the sequencer 35 sends the image data to the printer unit 24 in response to every horizontal synchronization signal.

In the present embodiment, the parameters set in the sequencer 35 are suitably varied by a command for variation of resolution (for dot density) from the console panel 22. Also the CPU 19 controls the printer interface 18 in such a manner that the start of a line is always sent in each line at the data transfer from the bit map memory 17 to the data buffer 31 and that white data are given in the blank portion generated by image reduction.

Control Sequence (FIG. 7)

The control sequence of the CPU 19 for the functions explained above will be explained in the following with reference to a flow chart shown in FIG. 7. It is assumed that the data supplied from the host computer 11 are already edited in the unit of a page and developed in the bit map memory 17, and that the dot density information set from the console panel 22 is stored in a predetermined address of the RAM 20.

At first, in a step S1, the dot density information set from the console panel 22 is read from the predetermined address of the RAM 20. A next step S2 discriminates whether a change in the print dot density, from the normal print dot density, is required, and the sequence proceeds to a step S3 or S6 respectively if such change is required or not.

Thus, if the step S2 identifies the instruction for a change of the dot density, the sequence proceeds to the step S3 for sending a print dot density designating command to the control circuit 25 of the printer unit 24 so as to rotate the polygon mirror 27 corresponding to the instructed dot density. Then the parameters corresponding to the instructed dot density are sent to the sequencer 35 of the printer interface 18, and the printing operation is conducted in a step S5.

On the other hand, if the step S2 identifies the absence of request for the change of dot density, the sequence proceeds to a step S6 for maintaining the revolution of the polygon mirror 27 corresponding to the normal printing operation. Then a step S7 sets parameters in the sequencer 35 of the printer interface 18 in order to obtain optimum output image, and the sequence proceeds to the step S5.

If the dot density for normal printing operation is fixed, the step S6 is unnecessary, and it is merely required to reset the revolution of the polygon mirror.

3RD EMBODIMENT (FIG. 8)

In the foregoing 2nd embodiment, the print dot density is entered from the console panel 22, but it is also possible enter the image magnification for enlargement or reduction from the panel 22.

Other processes are identical with those explained in relation to FIG. 7.

The CPU 19 compares said image magnification for enlargement or reduction with the dot density at the dot development of the data from the host computer, then selects a dot density corresponding to said magnification and executes the printing operation. For example, if the dot density of the print data is 240 dpi, and the image magnification is $\frac{1}{2}$, there is selected a dot density of 480 dpi.

Figure 8:
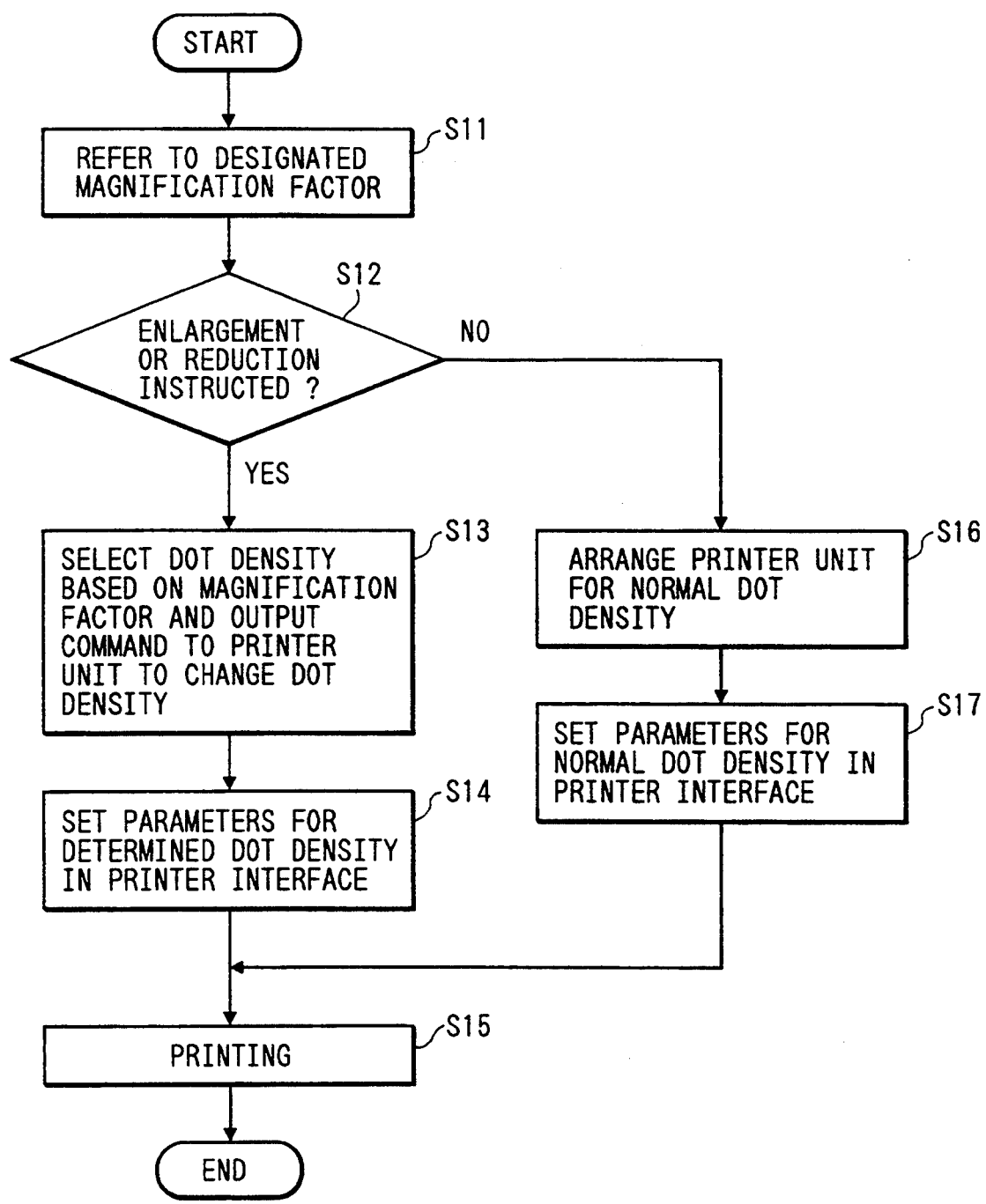
FIG. 8 is a flow chart of the control sequence of the CPU in a third embodiment.

FIG. 8 is a flow chart of the control sequence of the CPU in the 3rd embodiment, and the conditions prior to the start of said flow chart are same as those for FIG. 7, except that the predetermined address of the RAM 20 stores the information on the image magnification, set by the console panel 22.

At first a step S11 reads the information on the image magnification from the RAM 20, and a step S12 discriminates the presence of an instruction for variable magnification (for enlargement or reduction).

In the presence of such instruction, a step S3 selects a dot density corresponding to the image magnification, and sends a command to the printer unit 24 for effecting the printing operation with said dot density. Then a step S14 sets parameters corresponding to thus determined dot density in the printer interface 18, and a step S15 executes the printing operation.

On the other hand, if the step S12 identifies the absence of the instruction for the variable magnification, the sequence proceeds to steps S16 and S17 for enabling the printing operation with the normal dot density, and the step S15 executes the printing operation.

As explained in the foregoing, the present embodiment enables enlarged or reduced page printing without any change in the output file by the host computer.

In the above-explained embodiment the print dot density is switched in several levels, but it is also possible to vary said dot density in continuously manner, and there can be achieved a zooming function for continuously enlarging or reducing the print data. The required processes are identical with those in the 2nd or 3rd embodiment.

Though the foregoing description has been limited to the laser beam printer, but the foregoing embodiment is naturally applicable also to other printers.

4TH EMBODIMENT

In the following 4th embodiment, there may be employed structures shown in FIGS. 3 and 4, as in the 2nd and 3rd embodiments.

Structure (FIG. 3)

The structure of a printing apparatus of the 4th embodiment is shown in FIG. 3.

There are provided a host computer 11 for supplying the print data; and a printing apparatus 12 of the 4th embodiment, composed of a print control unit 13 for processing the print data and a printer unit 24 for executing the printing operation.

Figure 11:
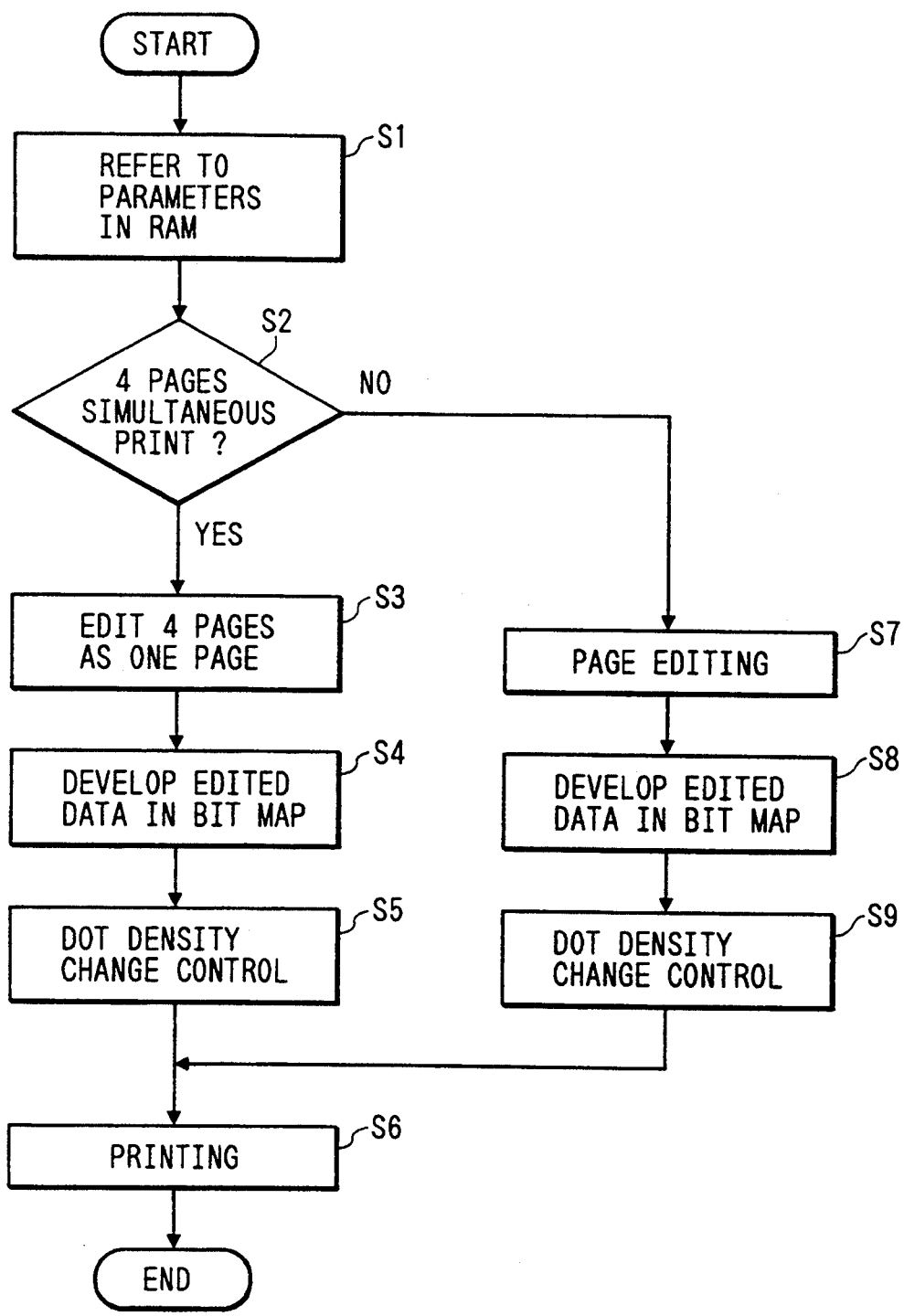
FIG. 11 is a flow chart of printing control in a fourth embodiment.

There are also provided a host interface 14 for controlling the data reception from the host computer 11; a page buffer memory 15 for storing at least four pages of received print data and effecting page editing; a CGROM 16 storing dot matrix character patterns corresponding to data codes; a bit map memory 17 constituting an image memory for developing the print data in the form of dot data and capable of developing dot image data of four pages; a printer interface 18 for serial output of the print data from the bit map memory 17 to the printer unit 24 and for controlling the printer unit 24; a CPU 19 for controlling various devices, data transfer, page editing and dot data development in the print control unit 13; a RAM 20 used as the work area for the CPU 19; a program ROM 21 storing a control program of the CPU 19 corresponding to a flow chart shown in FIG. 11; a console panel 22 for external entry of the commands to the printing apparatus; and a system bus 23 connecting the various components of the print control unit 13.

The structure of the printer unit 24 is shown in FIG. 4. As said structure is same as already explained in the 2nd embodiment, it will not be explained further.

Figure 9:
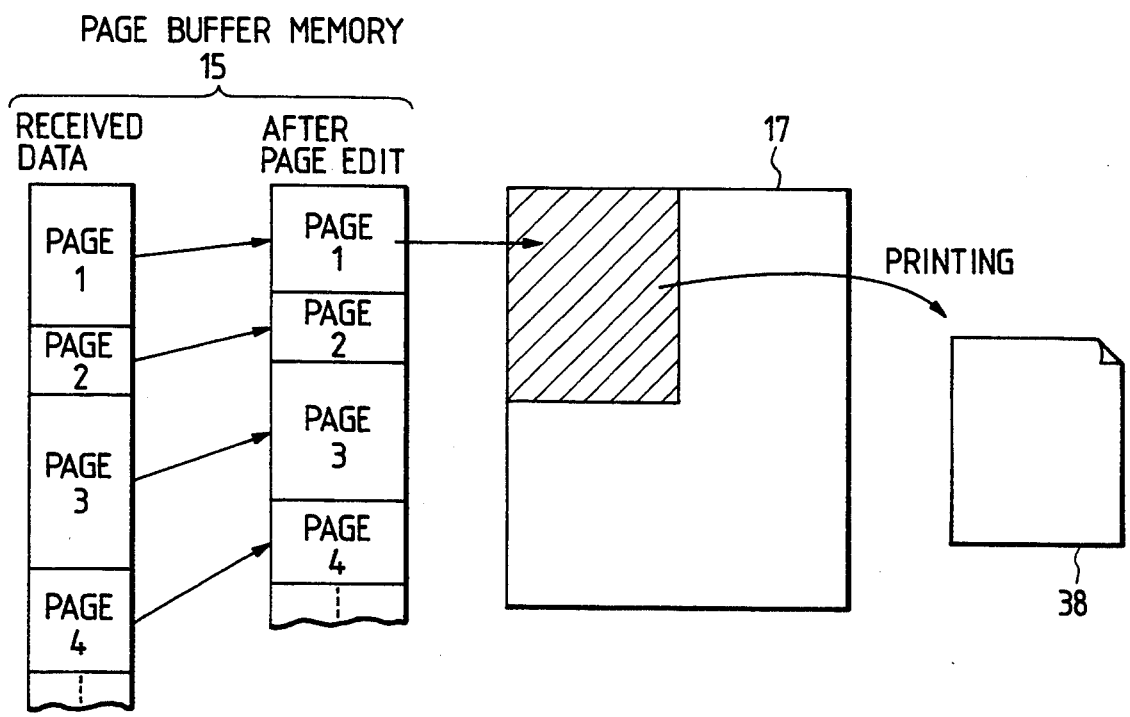
FIG. 9 is a schematic view showing the principle of ordinary printing.
Figure 10:
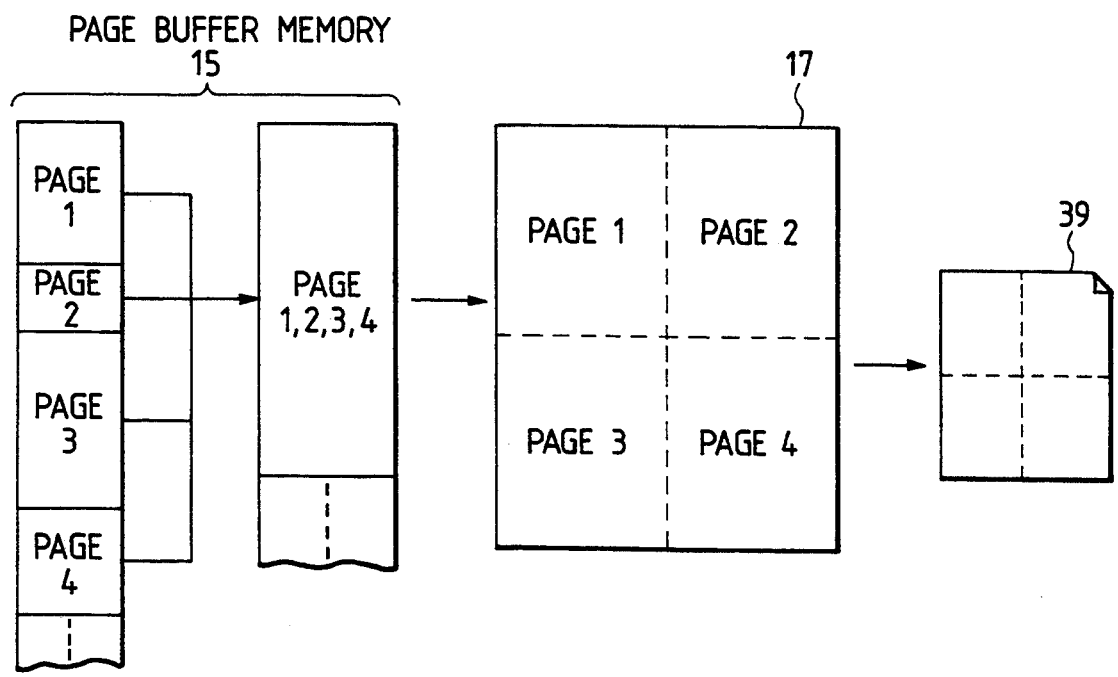
FIG. 10 is a schematic view showing the principle of 4-page simultaneous printing in a fourth embodiment.

Outline of Printing Operation (FIGS. 9 and 10)

The outline of the printing operation of the present embodiment will be explained in the following.

At first a normal printing operation will be explained with reference to FIG. 9.

The CPU 19 receives the print data supplied from the host computer 11 through the host interface 14, and stores said data in the page buffer memory 15. At the same time, the CPU 19 reads thus stored data, analyzes the command if the read data are a control code, and edits the print data of a page with an instructed format in the page buffer memory 15. Also the CPU 19 reads, in succession, the already edited print data of a page, selects a font in the CGROM 16 according to the instructed style and size of characters, thereby generating character patterns corresponding to the character codes in the edited data, and develops said character patterns in a page area (hatched area) in the bit map memory 17. Upon completion of the character pattern development over a predetermined number of lines from the start of a page, the CPU 19 controls the printer interface 18 to send control signals such as a print start signal and a vertical synchronization signal to the printer unit 24 thereby activating said printer unit 24, and transfers the data of the bit map memory 17 to an internal buffer of the printer interface 18. Said interface 18 sends thus transferred print data in the form of serial signals, to the printer unit 24 in synchronization with the horizontal synchronization signal from the printer unit 24, whereby the hatched area of the bit map memory 17 is printed on the printing sheet 38. Thereafter the succeeding edited print data are similarly developed in the bit map memory and are printed.

The above-mentioned predetermined number of lines corresponds to the number of lines in one of several blocks into which a page is divided, or the number of lines in a page. In the former, while a block is printed by the printer unit 24 through the printer interface 18, the print data development is conducted in the next block so as to be in time for the printing of said block. In the latter, the printing is started after the print data of a page are developed on the bit map memory. The latter method is employed in the present embodiment, but the former method can also be employed likewise.

In the following there will be explained the outline of 4-page simultaneous printing of the present embodiment, with reference to FIG. 10.

When the control circuit 25 of the printer unit 24 receives a print dot density selecting command through the printer interface 18, it controls the motor 28 so as to rotate the polygon mirror 27 at a speed corresponding to said dot density. If the transporting speed of the printing sheet is constant, the print density in the sheet transporting direction can be elevated by increasing the revolution of the polygon mirror 28. In this state the dot density in the horizontal scanning direction is inversely lowered, but the pixel density can be increased by increasing the clock frequency of the image signal released from the printer interface 18 to a value corresponding to the print density in the sheet transporting direction. In this manner reduced printing is achieved. More specifically, all the image data (of four pages) in the bit map memory 17 can be printed in a printing sheet, by doubling the revolution of the polygon mirror 27 and quadrapling the rate of the image clock signals.

When the 4-page simultaneous printing mode is designated from the console panel 22, a corresponding information is stored in a predetermined address of the RAM 20. The print data received thereafter are stored in succession in the page buffer memory 15, and the CPU 19 edits the data of 4 pages as a single set of data after the reception thereof. The editing is so conducted that the data of different pages will be positioned in predetermined areas of the bit map memory 17 as shown in FIG. 10. Thereafter the character patterns are generated from the edited data and are developed in the bit map memory 17. Then, prior to the transfer of the data from the bit map memory 17 to the printer unit 24, the print dot density is doubled, for example from 240 dpi in the normal printing to 480 dpi, by sending a command to the printer unit 24 through the printer interface 18. Thus the number pixels per a width is doubled. Then the CPU 19 transfers, in succession, the data of the bit map memory 17 to the printer interface 18. Thus small characters are generated, and data of 4 pages can be printed in a sheet 39.

Control Sequence (FIG. 11)

The control sequence of the CPU 19 for the above-explained functions will be explained with reference to a flow chart shown in FIG. 11.

It is assumed that the RAM 20 stores, in a predetermined address thereof, an instruction for the normal printing or the 4-page simultaneous printing given from the console panel 22 as a parameter, and that the received print data are stored in the page buffer 15.

At first a step S1 refers to the parameter in the RAM 20, and a step S2 discriminates whether the 4-page simultaneous printing is instructed.

In the presence of said instruction, a step S3 edits the print data of four pages as a single page. Then a step S4 generates character patterns corresponding to thus edited data, and develops said patterns in the bit map memory 17. Then a step S5 sends an instruction for doubling the dot density to the printer unit 24, and a step S6 starts the printing operation.

On the other hand, if the step S2 identifies the selection of normal printing (which is selected as the initial state at the start of power supply), the sequence proceeds to a step S7. The step S7 executes page editing. Then a step S8 develops the character patterns in the bit map memory 17, a step S9 sends an instruction for the normal dot density to the printer unit, and the printing operation is started in the step S6.

Figure 12:
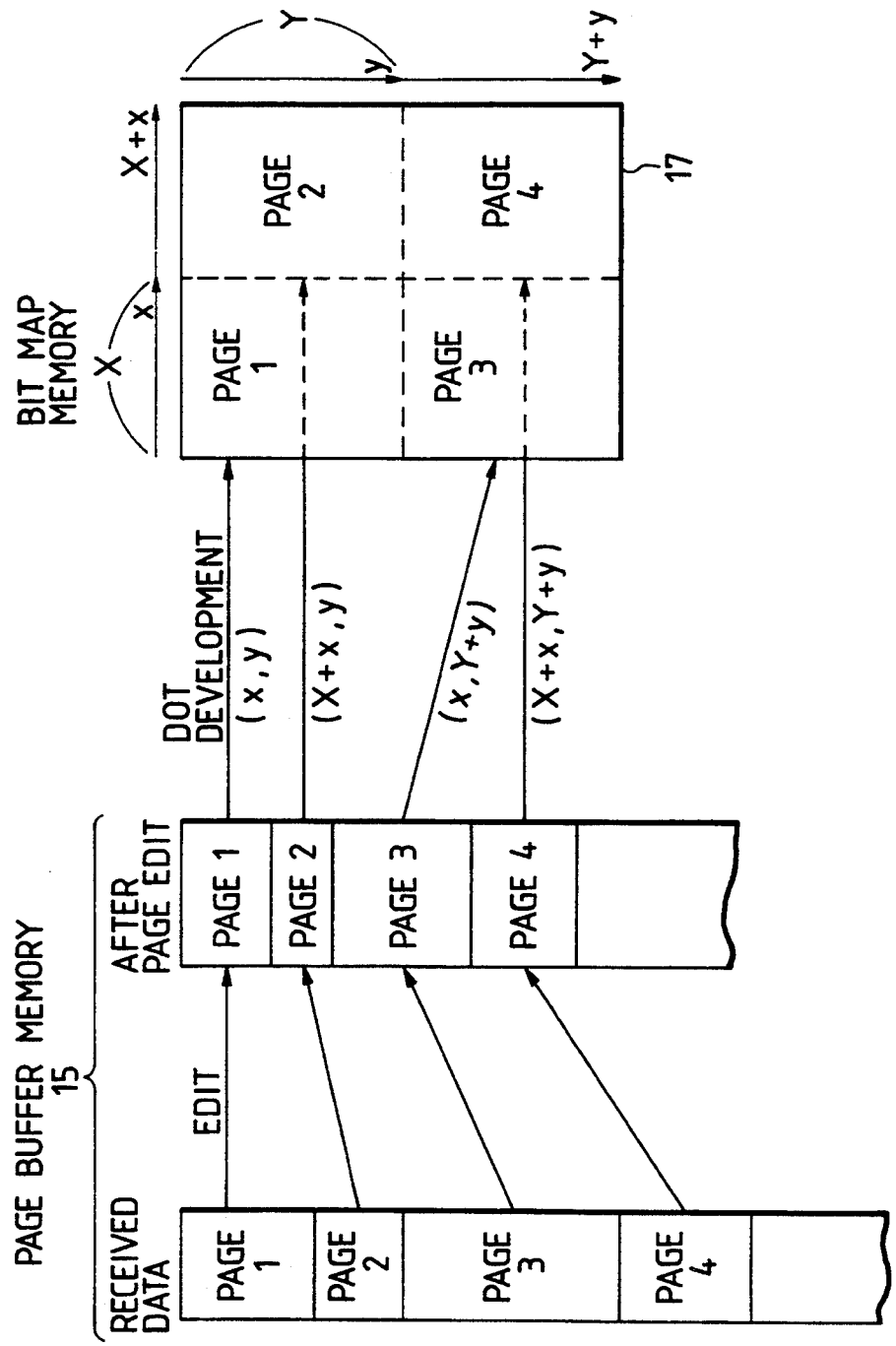
FIG. 12 is a schematic view showing the principle of 4-page simultaneous printing in a fifth embodiment.
Figure 13:
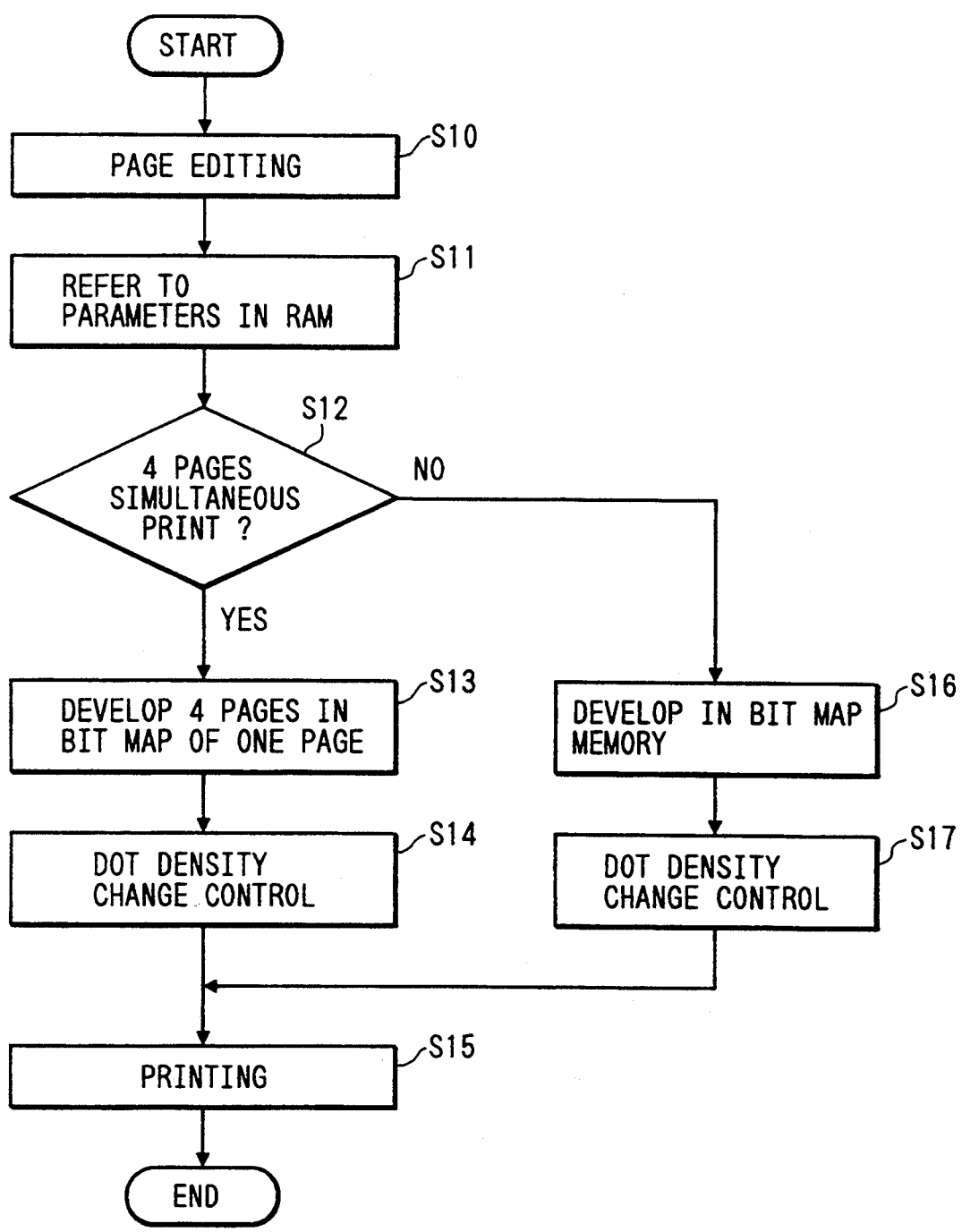
FIG. 13 is a flow chart of printing control in the sequence shown in FIG. 12.

5TH EMBODIMENT (FIGS. 12 and 13)

In the 4-page simultaneous printing mode in the foregoing 4th embodiment, the data of 4 pages are edited in the form of data of a single page. However, it is also possible to effect the editing for each page and to develop the data of each page in a predetermined position of the bit map memory 17 as shown in FIG. 12.

More specifically, the pattern data of the first page are developed according to the (x, y) coordinates of the bit map memory 17. The second page is developed with a shift to right corresponding to the width of a page, by adding a constant X corresponding to said width to the x-coordinate of the data of the second page. Similarly a constant Y corresponding to the length of sheet of a page is added to the y-coordinates for the third page, and X and Y are added to the x- and y-coordinates for the fourth page to obtain the development as shown in FIG. 12. Thereafter four pages can be printed on a sheet with the doubled resolution as in the foregoing embodiment.

FIG. 13 is a flow chart for the above-explained control. Also in this case it is assumed that the instruction from the console panel 22 is stored as a parameter in the predetermined address of the RAM 20, and that the received print data are already stored in the page buffer memory 15.

At first a step S10 edits the print data stored in the page buffer memory 15 for each page. Then a step S11 refers to the parameter in the RAM 20, and a step S12 discriminates whether the 4-page simultaneously print mode is selected.

The sequence then proceeds to a step S13 or S16 respectively if said mode is selected or not.

The step S13 developes the patterns of the data of each after editing in a respectively area of the bit map memory 17. Then a step S14 sends a command for doubling the print dot density to the printer unit 24, and sets the reference pixel clock signals (not shown) for image data output from the printer interface 18 at a value corresponding to the print density, and a step S15 executes the printing operation. On the other hand, if the 4-page simultaneous printing mode is not selected, the step S16 develops the patterns corresponding to the data of an edited page in the predetermined position of the bit map memory 17. Then a step S17 sends a command to the printer unit 24 for selecting the dot density for normal printing, and the step S15 executes the printing operation.

As explained in the foregoing, the present embodiment enables to print the data of plural pages on a sheet, by elevating the print dot density from that in the normal printing.

In the foregoing description, the selection of the 4-page simultaneous printing mode is manually entered from the console panel 22, but such instruction may naturally be supplied by a control code from the host computer. However the instruction from the panel is extremely convenient in that the print data themselves are not changed.

The data development in the bit map memory is exemplified in FIGS. 9, 10 and 11, but may assume any form as long as the output image can be reproduced. Also the capacity of said memory may be smaller than four pages if the data development for unprinted page can be conducted in time during the printing operation for another page.

Furthermore, the present embodiment is not limited to the simultaneous printing of 4 pages, since printing of 9 pages on a sheet is possible if the bit map memory 17 has a sufficient capacity and the printer unit 24 can print with a tripled dot density.

6TH EMBODIMENT

Figure 14:
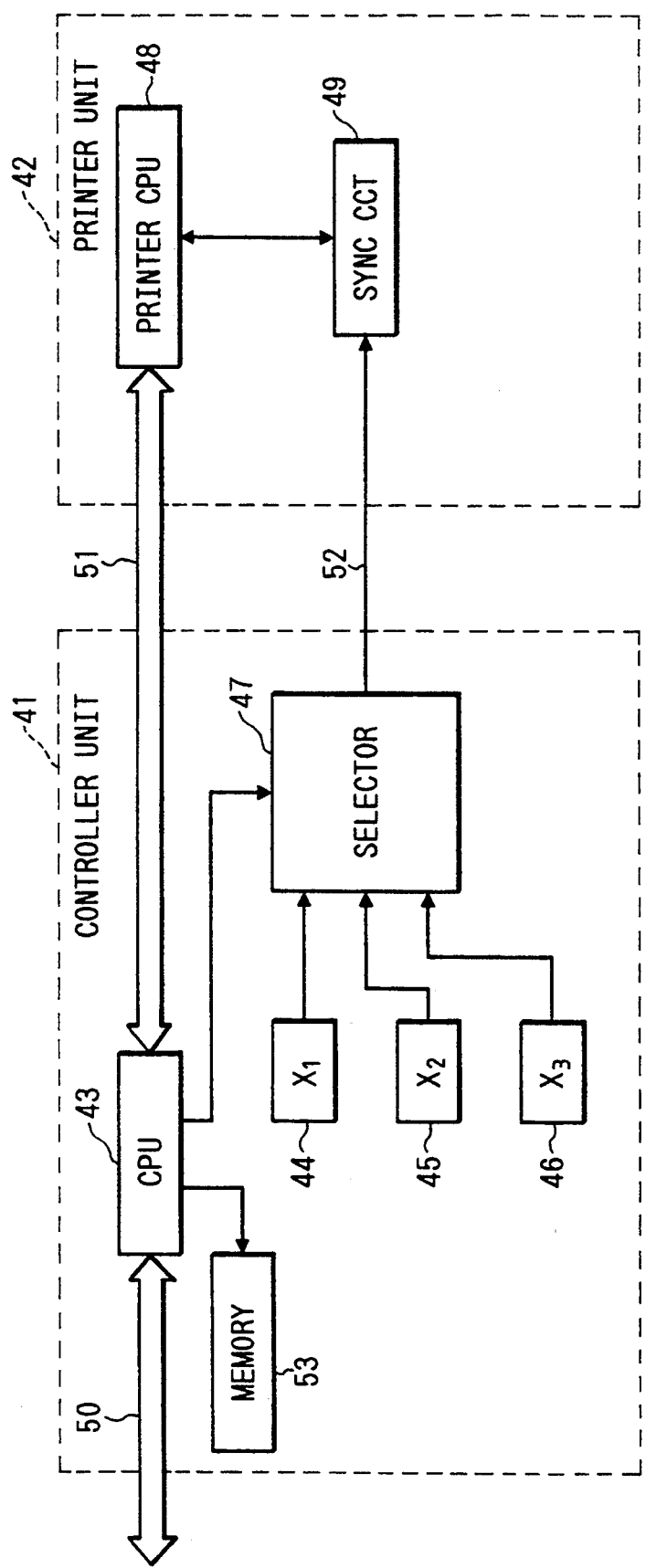
FIG. 14 is a block diagram of a printing apparatus of a sixth embodiment of the present invention.

FIG. 14 is a block diagram of a printing apparatus constituting a sixth embodiment of the present invention, composed of a controller unit 41 in which a CPU 43 controls the various units according to a control program stored for example in an unrepresented ROM, and a printer unit 42 for processing print data entered through a bus 51 in synchronization with clock signals supplied from a synchronization circuit 49.

Clock generators 44-46 send clock signals X1-X3 to a selector 47, which selects one of said clock signals X1-X3 according to a selection control signal from the CPU 43 and sends thus selected clock signal to the synchronization circuit 49 through a bus 52. A printer CPU 48 processes the print data entered through the bus 51.

A bus 50 is used for sending data, from a host equipment such as a word processor, or an unrepresented console panel, to the CPU 43. A mode memory 53 functions as a work memory of the CPU 43 and temporarily stores the information on various mode setting.

Upon detecting that the memory 53 stores a mode for automatic setting of the actual print dot density of the printer unit 42, the CPU 43 executes the automatic setting of the dot density of the printer unit 42.

The automatic setting of the actual print dot density is made by the comparison, made by the CPU 43, of the horizontal print area of the print data and the effective printing width of the recording medium.

The function of the apparatus shown in FIG. 14 will be explained in the following with reference to a flow chart shown in FIG. 15.

Figure 15:
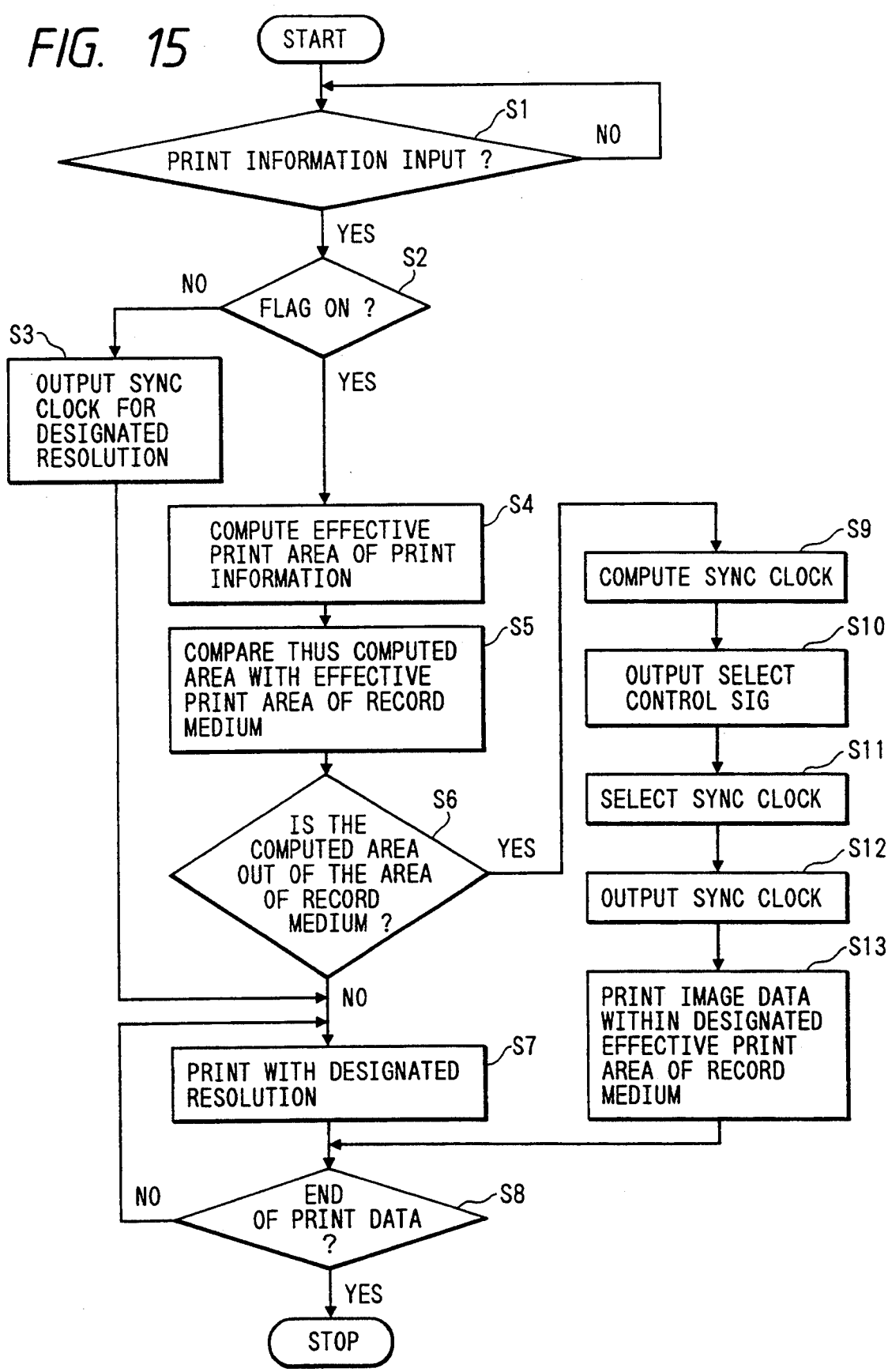
FIG. 15 is a flow chart showing an example of automatic resolution setting sequence.

FIG. 15 shows an example of the automatic resolution setting sequence to be executes by the CPU 43.

At first a step S1 awaits the input of the print data through the bus 50, and, upon entry of said print data, the CPU 43 discriminates, in a step S2, whether a flag in the memory 53 indicating the automatic resolution setting mode is on. If not, a step S3 sends the clock signal for printing with the resolution designated in the print data to the synchronization circuit 49 through the selector 47 and the sequence proceeds to steps S7 and S8, whereby the print data positioned outside the effective print area are disregarded and not printed.

On the other hand, if the step S2 identifies that said flag is on, the CPU 43 calculates, in a step S4, the effective print area of the print data from the resolution, font and maximum number of characters entered from the host equipment or the console panel, for example by calculating the font pitch multiplied by the maximum number of characters. Then a step S5 compares the horizontal range (perpendicular to the transporting direction of the printing medium) of the calculated effective print area with the effective print area preset for the printing medium, and a step S6 discriminates whether the calculated print area of the print data overflows the print area of the printing medium. If not, a step S7 executes the printing of said data (including character information and image information) with the resolution preset for the print data. Then a step S8 discriminates whether all the print data are processed, and, if processed, the sequence is terminated. On the other hand, if not yet processed, the sequence returns to the step S7.

On the other hand, if the step S6 identifies overflowing, a step S9 determines such a clock signal as to obtain a resolution higher than the preselected resolution, or namely to obtain a dot density by which the print data can be accommodated within the effective print area of the printing medium. Then a step S10 sends a control signal to the selector 47. Thus a step S11 selects one of the clock signals X1–X3, and a step S12 sends the selected clock signal to the synchronization circuit 49 through the bus 52. Then a step S13 prints the print data within the effective print area of the printing medium, and the sequence returns to the step S8.

In the above-explained embodiment, if the printing with the dot density designated in the input print data overflows the effective print area predetermined in the printing medium, the resolution is varied for example in three levels by selecting one of the clock signals X1–X3 generated from the clock generators 44–46, by means of the selector 47. It is however possible also to continuously vary the resolution with a phase-locked loop circuit, thereby printing the data without overflowing or blank in the effective print area of the printing medium.

It is furthermore possible to manually enter the resolution for example from the console panel.

7TH EMBODIMENT

Figure 16:
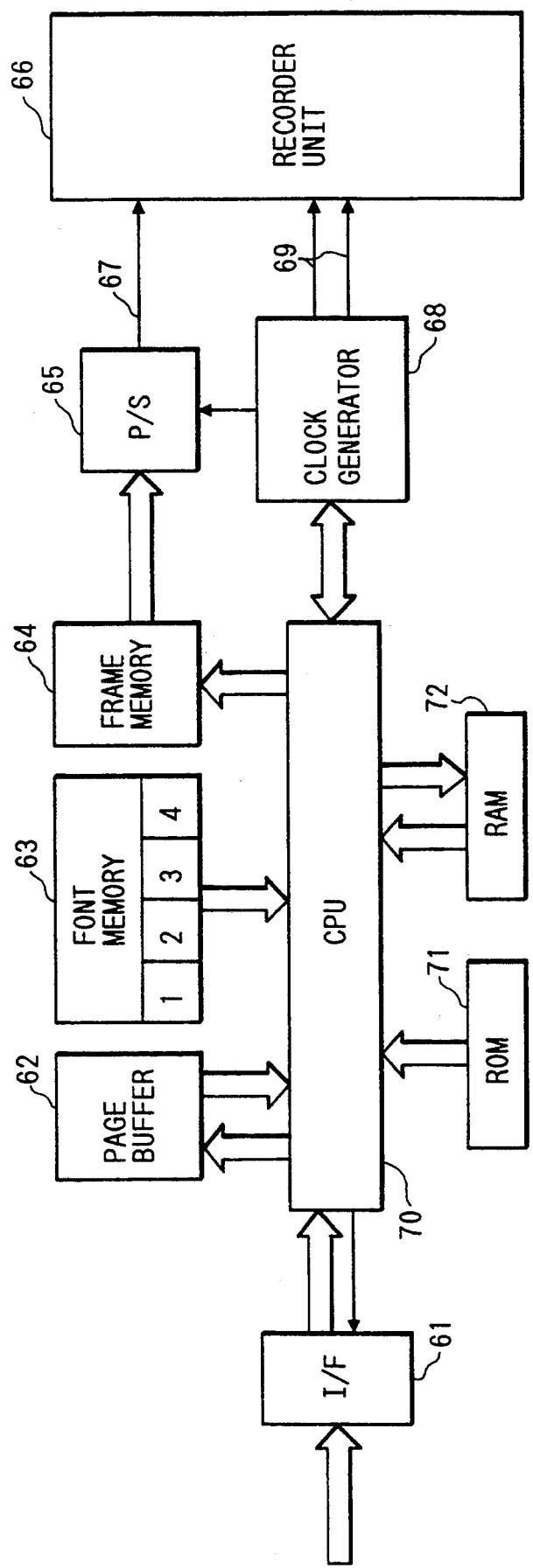
FIG. 16 is a block diagram of an image forming apparatus constituting a seventh embodiment.

(Structure (FIG. 16)

FIG. 16 shows the structure of an image forming apparatus constituting a 7th embodiment, wherein a laser beam printer is employed.

Figure 17:
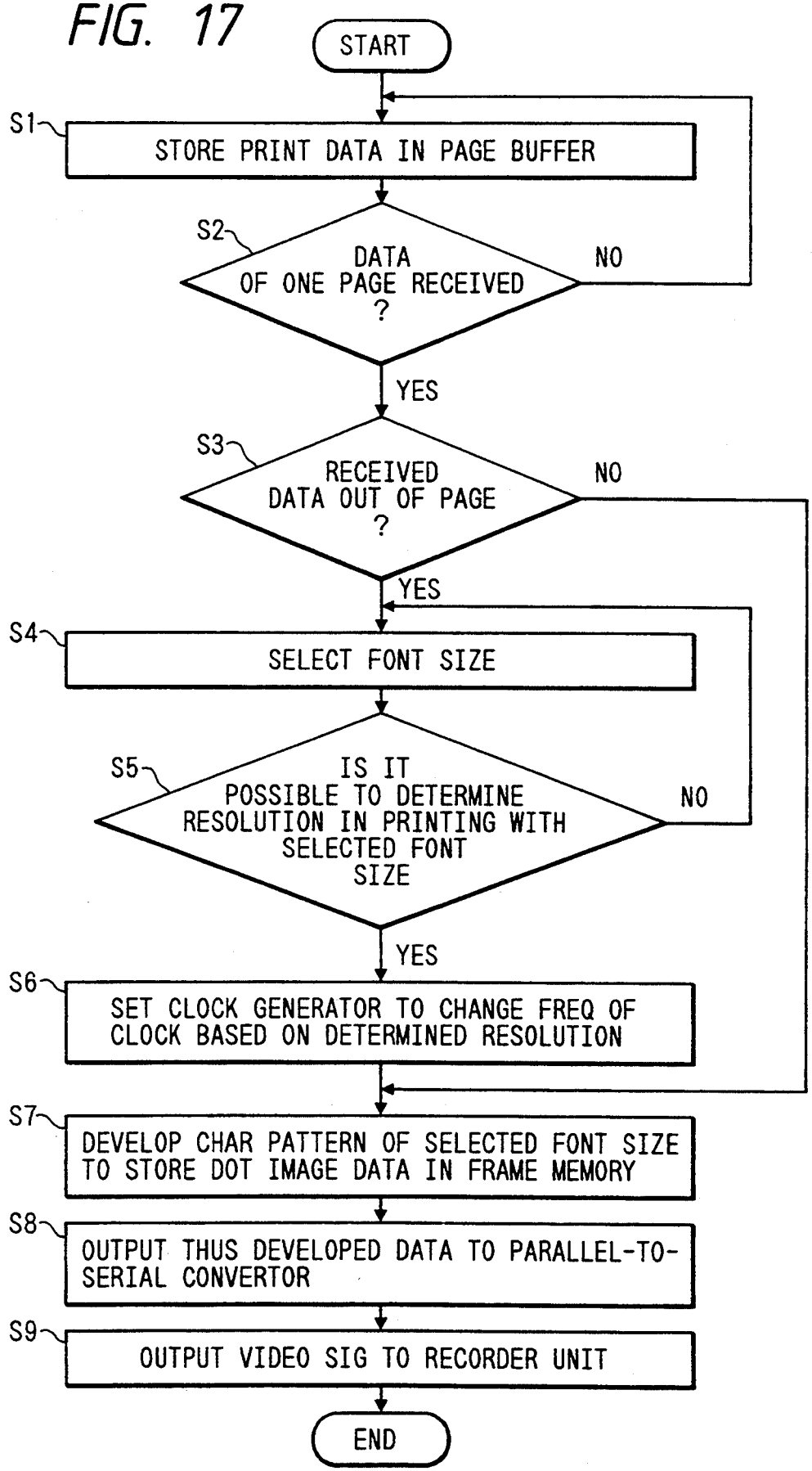
FIG. 17 is a flow chart of the control sequence in the seventh embodiment.

There are shown an interface 61 for controlling data reception from a host computer (not shown) or the like; a page buffer memory 62 for storing the received print data and effecting page editing; a CGROM 63 storing dot matrix character patterns corresponding to character codes, and in this case storing four character patterns of different numbers of dots for each character code; a frame memory 64 in which image data corresponding to the output image are to be developed; a parallel-serial converter 65 for converting the data developed in the frame memory 64 into serial video signal 67 for supply to a recorder unit 66; a programmable clock generator 68 for generating clock signals for the parallel-serial converter 65 and the recorder unit 66; a CPU 70 for controlling the entire apparatus according to a control program corresponding to a flow chart shown in FIG. 17 and stored in a ROM 71; a RAM 72 used as a work area of the CPU 70; and clock signal and horizontal and vertical synchronization signals 69 supplied from the clock generator 68 to the recorder unit 66.

Outline of Control Sequence

At first there will be explained the control on the print dot density.

As explained before, the present embodiment is based on a laser beam printer.

Though the details are not shown, the recorder unit 66 is composed of a semiconductor laser on/off controlled by the video signal 67, a photosensitive drum for forming an electrostatic latent image, a polygon mirror for scanning the photosensitive drum with the laser beam, a motor for rotating said polygon mirror etc., and the formed electrostatic latent image is converted into a visible image on a recording sheet according to a known process. In the present embodiment the revolution of said photosensitive drum is assumed to be constant.

Consequently the print dot density can be varied by the control of the rate of clock signals from the clock generator 68. For example, a doubled dot density, in comparison with that in the normal printing, can be obtained by quadrupling the rate of clock signals supplied to the parallel-serial converter 65 and doubling the revolution of the polygon mirror.

In the present embodiment, this control is done by the CPU 70.

The printing process in the present embodiment is conducted as follows.

Upon receipt of data of a page from an unrepresented host equipment, the CPU 70 discriminates, from the amount said data, whether a change in the dot density is necessary or not. Said discrimination is based on whether the area of the image data developed in the frame memory according to the printing parameters in the received data is larger than the developable area of image data in the normal print dot density, namely whether the image formed according to the instruction in the print data overflows the page. However said discrimination can also be made on the number of characters in a line or the number of lines in a page.

In case an overflow is identified, though it is possible to select a font with fewer number of dots thereby reducing the pitch of characters and lines, the present embodiment selects a font with same or larger number of dots compared with the instructed font, and the image data are developed in the frame memory and thus developed image data are printed with an increased dot density so as that the data can be accommodated in the recording sheet. In this manner the printed characters can be maintained at high quality.

If the image data developed in the frame memory requires an area of twice in the vertical and horizontal directions, in comparison with the area in the normal printing, the print dot density can be doubled. The determination of dot density can be made either by analyzing the print data, or after the actual development of said image data in the frame memory 64. As will be apparent from the foregoing description, the frame memory has a capacity in excess of one page.

Control Sequence (FIG. 17)

In the following there will be explained the control sequence of the CPU 70 with reference to FIG. 17.

Upon reception of the data from an external equipment, a step S1 stores the received data in the page buffer 62, and this step S1 is repeated until a step S2 identifies the reception of data of a page.

Thereafter a step S3 discriminates whether the received data can be accommodated in a page, and the sequence proceeds to a step S7 or S4 respectively if said discrimination is affirmative or negative.

The step S4 selects a font size capable of maintaining sufficient print quality even at an elevated print dot density. Then a step S5 discriminates whether thus selected font size provides a printable resolution (print dot density). For example, if the reproducible dot density is in a range of 240 to 480 dpi, discrimination is made whether a dot density within this range is achievable.

After the determination of the optimum font size and print dot density in this manner, a step S6 sets data corresponding to the resolution in the clock generator 68, thereby generating clock signals of a corresponding frequency.

Then a step S7 executes the development of imate data of one page, by developing, in succession, the character patterns of the selected font size in the frame memory 64. Then steps S8 and S9 send the data, developed in the frame memory 64, to the parallel-serial converter 65, thereby sending video signal to the recorder unit 66.

The parallel-serial converter 65 releases the video signal in synchronization with the clock signals thus set.

Figure 18:
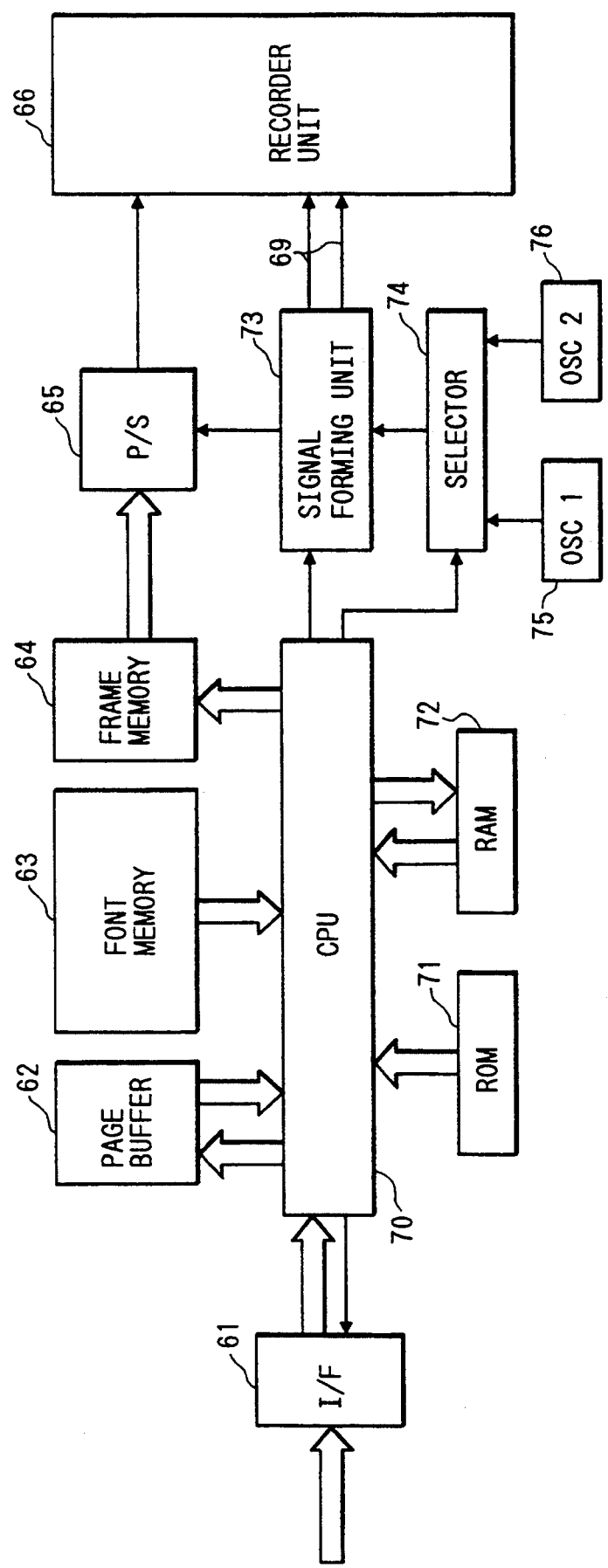
FIG. 18 is a block diagram of an image forming apparatus constituting an eighth embodiment.
Figure 19:
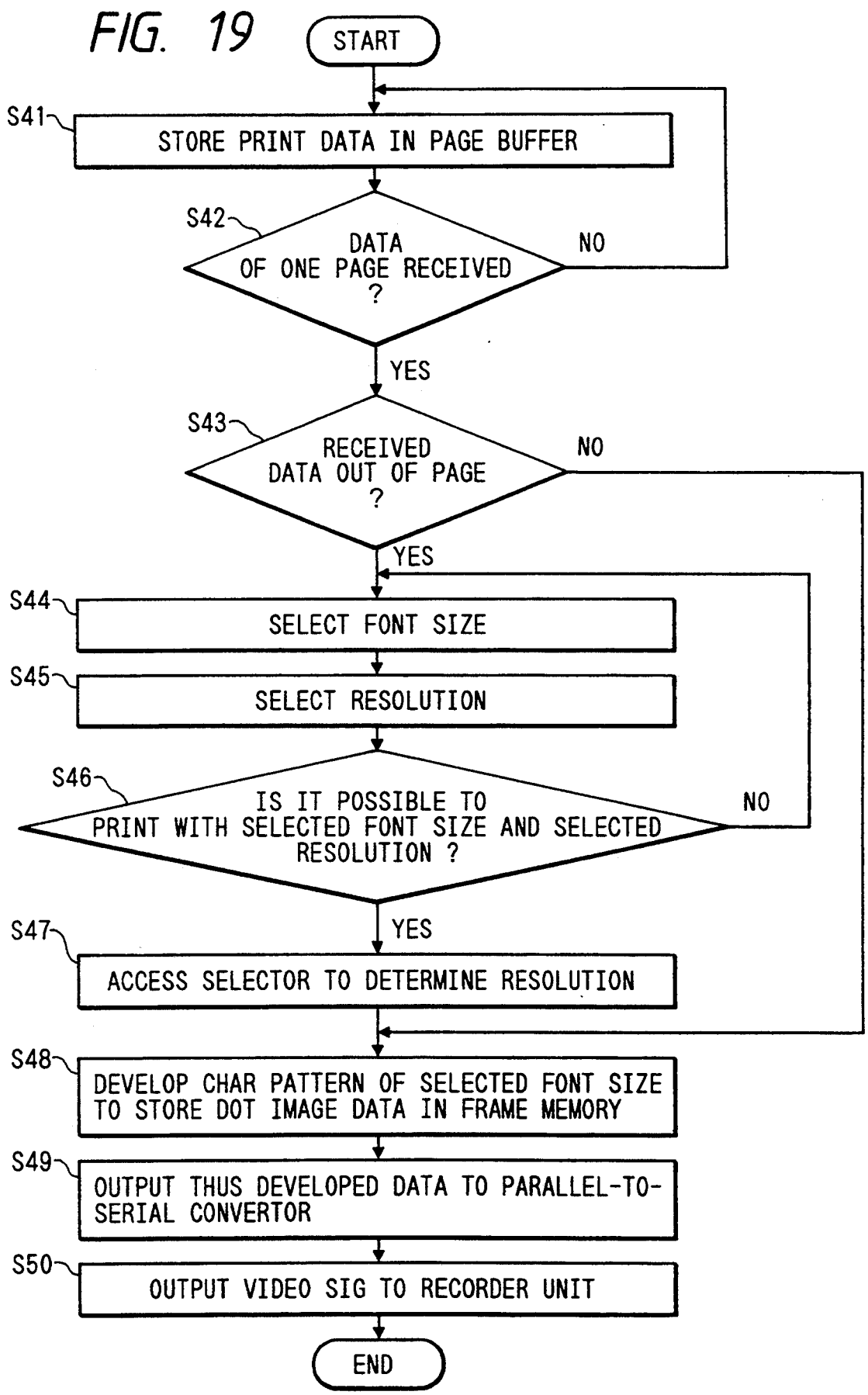
FIG. 19 is a flow chart of the control sequence in the eighth embodiment.

8TH EMBODIMENT (FIGS. 18 and 19)

FIG. 18 is a block diagram of an image forming apparatus constituting an eighth embodiment.

The present embodiment is different from the foregoing ones in that the frequency supplied to a signal forming unit 73 is obtained either from an oscillator 75 or 76 by the control of a selector 74. The oscillators 75, 76 have mutually different but fixed frequencies, which can be selected according to the requested resolution. Based on the clock signals from the oscillator selected by the selector 74, the signal forming unit 73 sends a conversion command signal to the parallel-serial converter 65, and also sends the horizontal and vertical synchronization signals to the recorder unit 66 through a signal line 69. In this manner the print dot density is selectable in two levels.

In the following explained is the control sequence of this eighth embodiment, with reference to FIG. 19. A program corresponding to FIG. 19 is stored in the ROM 71.

The control sequence up to a step S43 is same as that in FIG. 17 and will not, therefore, be explained.

If the received data cannot be accommodated in a page, the sequence proceeds to a step S44 for selecting a necessary font size from the font memory 63. Then a step S45 selects a resolution corresponding to the selected font size, and a step S46 discriminates whether the image printed with thus selected font size and resolution can be accommodated in a page. If not, the steps S44 and S45 are executed again to select other parameters.

After said parameter selection,-a step S47 sends a selection signal to the selector 74 so as to realize the determined resolution (print dot density).

Succeeding steps S48 to S50 are identical with the steps S7 to S9 in FIG. 17, generating character patterns corresponding to the edited character codes by a selected font of the CGROM 63 and developing the dot data in the frame memory 64. The prepared dot data are supplied to the parallel-serial converter 65, and the recording data are released in synchronization with the conversion command signal.

In the 7th and 8th embodiments, if the output image based on the received data overflows a page, the printing is made with an elevated resolution, instead of employing a character font with reduced number of dots, it is made possible to print the characters in a page without scarificing the quality thereof.

In the foregoing description the print dot density is varied in both vertical and horizontal directions, but it is also possible to vary, for example, the print dot density in the main scanning direction only, according to the received data.

9TH EMBODIMENT

Figure 20:
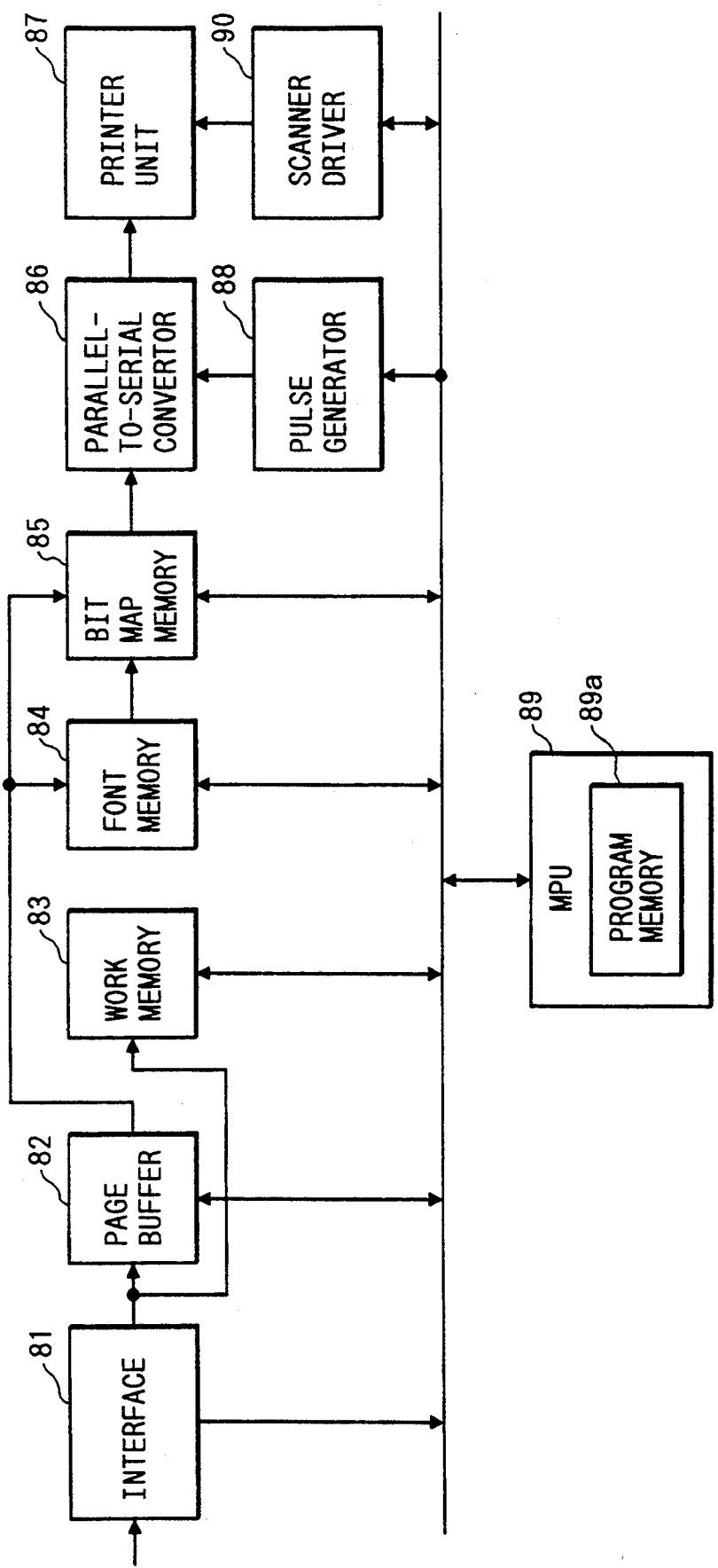
FIG. 20 is a block diagram of a laser beam printer constituting a ninth embodiment.
Figure 21:
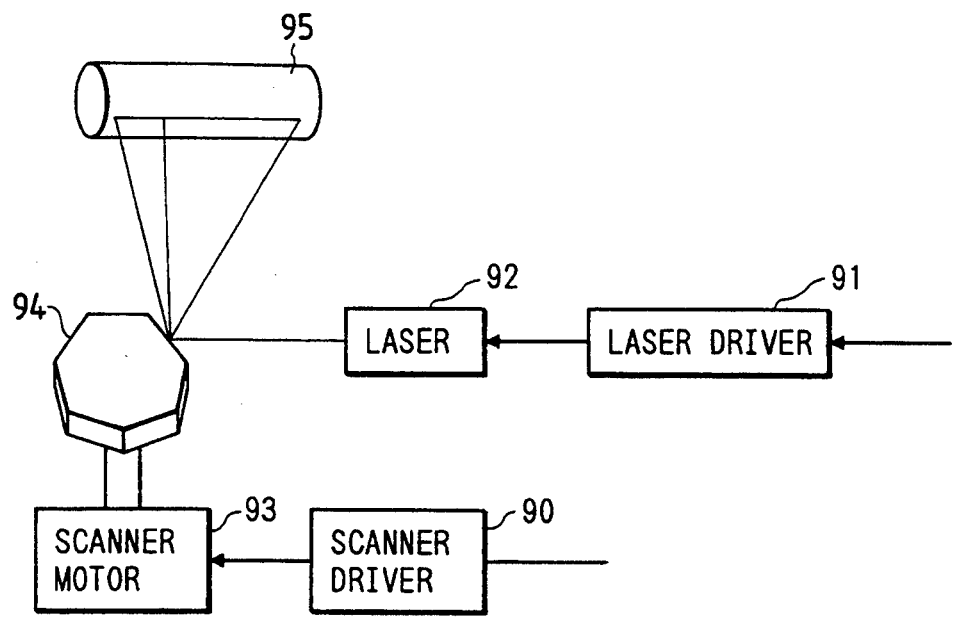
FIG. 21 is a schematic view showing the structure of a printer unit in the ninth embodiment.

Structure (FIGS. 20 and 21

FIG. 20 is a block diagram of a laser beam printer constituting a ninth embodiment.

There are provided an interface 81 for receiving, from an unrepresented host computer or the like, image data, text data and print data composed of print control parameters, including sheet size, font, font size, font style and image dot density of the image data; a page buffer memory 82 for storing the print data received through the interface 81 and effecting page editing with code analysis; a work memory 83 for storing the print control parameters for a printer unit 87 as will be explained later; a font memory 84 storing font data of different number of dots, classified for example according to the style and size; a bit map memory 85 for storing dot image to be transferred to the printer unit 87; a parallel-serial converter 86 for converting the parallel data, read from the bit map memory 85, into serial data for supply to the printer unit 87; and a pulse generator 88 for generating image clock signals of a frequency corresponding to the selected resolution (dot density). As the parallel-serial converter 86 releases the vedeo signal in synchronization with said image clock signals, the dot density in the main scanning direction can be varied, as will be explained later, by a change in the frequency of said image clock signals.

A MPU 89 controls the page editing and the printing operation, based on a control program (including that corresponding to FIGS. 22A and 22B), stored in an internal program memory 89a. A scanner driver 90 drives a scanner motor (to be explained later) constituting a part of the beam scanning system in the present embodiment, based on the speed data corresponding to the resolution set by the MPU 89.

The MPU 89 also functions as means for detecting the sheet size designated by the host computer and the sheet size in a sheet cassette loaded in the apparatus, and means for setting the print dot density based on the result of said detection. More specifically, the print dot density is determined from the relation of sheet sizes detected by said detecting means and is stored in the work memory 83. The pulse generator 88 and the scanner driver 90 are controlled according to said print dot density, and the printing operation is conducted by the printer unit 87.

FIG. 21 schematically shows the structure of the printer unit 87. In the present embodiment there is employed an optical printer in which an image is formed on a photosensitive member by scanning with a laser beam thereon.

A laser driver 91 turns on and off a laser 92 by the image (video) signal from the parallel-serial converter 86.

A scanner motor 93 rotates a polygon mirror 94 with a revolution corresponding to a value set in the scanner driver 90. A photosensitive member 95 rotated at a constant speed with a driving motor (not shown) and is axially scanned with the laser beam reflected by a face of the polygon mirror 94, whereby an electrostatic latent image is formed on said member. The image formation thereafter is conducted by a known electrophotographic process.

Outline of Function

In the above-explained image forming apparatus, if the data from the host computer are of B4-size while the sheet loaded in the apparatus is of A4-size, the printing operation is conducted with an elevated print dot density so as to accommodate the image in the A4-sized sheet.

The print dot density is controlled by data set in the pulse generator 88 and the scanner driver 90.

For example, following control is executed in order to double the print dot density.

Since the revolution of the photosensitive member 95 is constant, the number of scanning lines on the photosensitive member 95 has to be doubled in order to obtain a doubled dot density in the suc scanning direction. This is achieved by doubling the revolution of the polygon mirror 94.

However the doubled revolution of the polygon mirror 94 reduces the print dot density in the main scanning direction to a half. Thus, in order to double the dot density in said main scanning direction, the frequency of the video clock signals, which is the synchronization signal for the video signal, is to be quadrupled.

The above-explained control allows to double the print dot density, in comparison with that in the normal printing. Stated differently, the print dot densities in the main and sub scanning directions can be arbitrarily selected by the control of the pulse generator 88 and the scanner driver 90.

The calculation of the print dot density from the size of the sheet loaded in the apparatus and the size designated from the host equipment may simplified by storing the relation thereof in a table. In such case the data for the pulse generator 88 and the scanner driver 90 corresponding to each print dot density are also stored in said table.

Also the size of the sheet loaded in the apparatus can be detected in various methods. For example a cassette containing the printing sheets is inserted into a slot, there may be provided plural microswitches in said slot, and the sheet size can be detected from the contact of said microswitches with the cassette. Naturally there may be employed already known methods for detecting the sheet size.

Figure 22A:
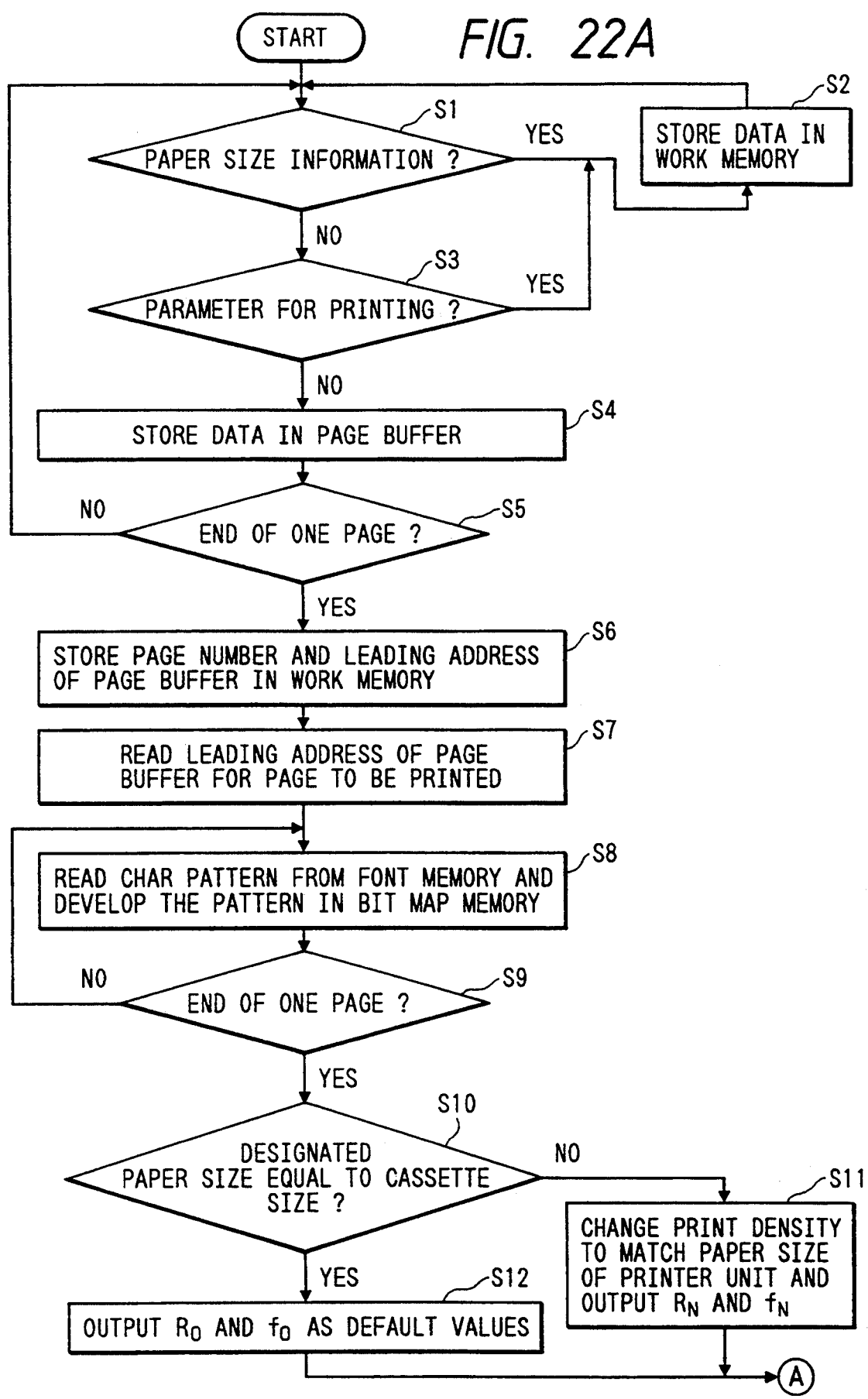
FIGS. 22A and 22B are flow charts showing a printing sequence in the ninth embodiment.
Figure 22B:
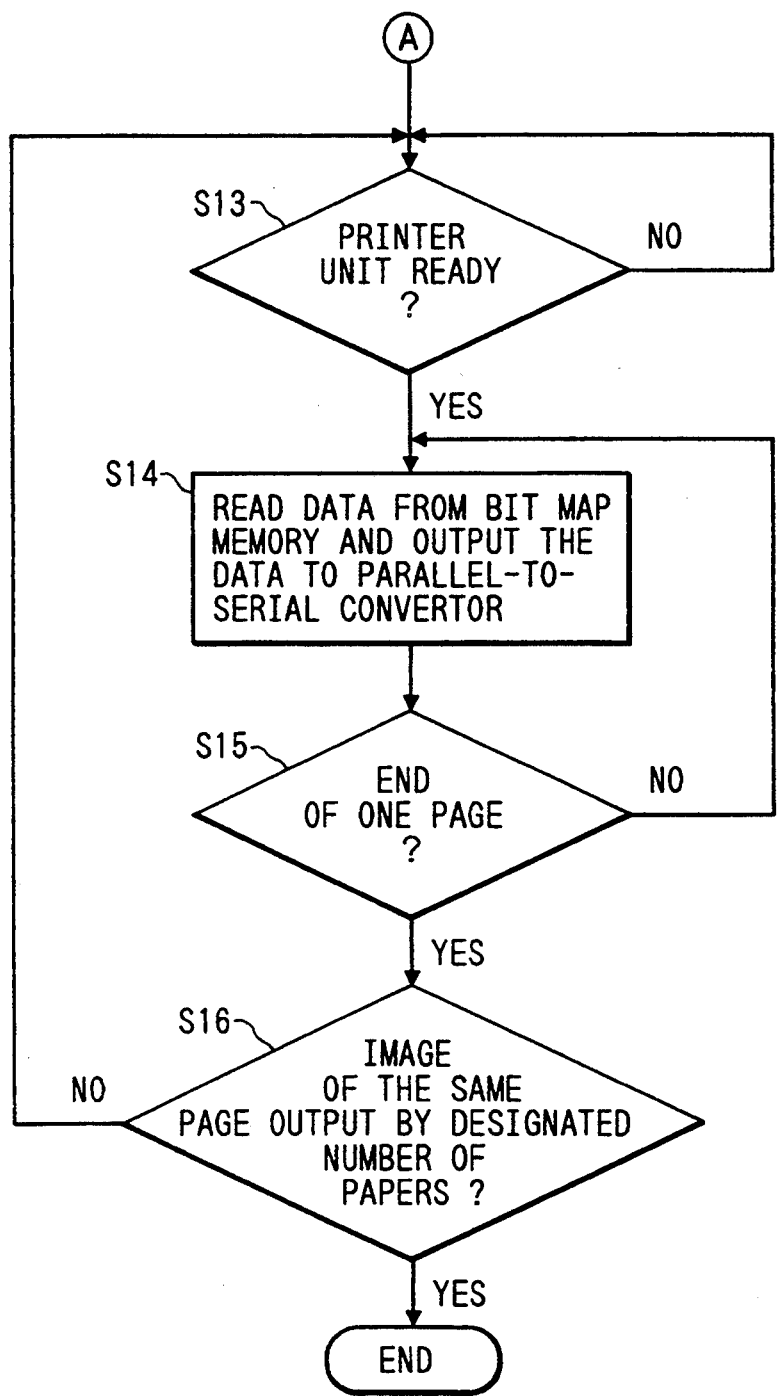

Control Sequence (FIGS. 22A and 22B)

In the following explained is the control sequence of the MPU 89, with reference to FIGS. 22A and 22B.

At first a step S1 discriminates whether the input data are sheet size designating information, and, if so, a step S2 stores the designated sheet size in the work memory 83.

On the other hand, if the discrimination of the step S1 turns out negative, a step S3 discriminates whether said data are printing parameters, and if so, the sequence proceeds to the step S2 for effecting a step explained above.

In other cases, namely if the input data are for example character codes, a step S4 stores said data in the page buffer 82, and the sequence from the step S1 is repeated until a step S5 identifies the completion of process for the data of a page.

Thereafter a step S6 constructs the page data by analyzing the data stored in the page buffer 82, and stores the page number and the start address of the page buffer in the work memory 83. Then a step S7 reads the data indicated by the start address, and a step S8 causes the font memory 84 to generate a character pattern, and develops it in the bit map memory 85. The step S8 is repeated until a step S9 identifies that the development of character patterns of a page is completed.

After the completion of pattern development of a page, the sequence proceeds to a step S10 for discriminating whether the size of sheet loaded in the apparatus coincides with the size designated by the host computer, stored in the work memory 83.

If said sizes mutually coincide, a step S12 stores default values $R_0$ and $f_0$, for obtaining the normal print dot density, respectively in the scanner driver 90 and the pulse generator 88.

On the other hand, if said sizes are mutually different, the print dot density is calculated from said sizes, and values $R_N$, $f_N$ for realizing said dot density are set in the scanner driver 90 and the pulse generator 88.

After the data setting in this manner, a step S13 waits until the printer unit 87 becomes capable of printing with thus set dot density. A next step S14 sends the data developed in the bit map memory to the parallel-serial converter 86 for supply as the video signal to the printer unit 87. Then a step S15 discriminates whether the process of the step S14 is completed for the data of a page, and, if not completed, the sequence returns to the step S14. After the completion of data output of a page, a step S16 discriminates whether the image of said page has been printed by a predetermined number, and the sequence starting from the step S13 is repeated until said predetermined number of prints is obtained.

As explained above, the present embodiment enables, even when a sheet size different from that loaded in the apparatus is designated by a control command in the print data, to form the output image on the sheet available on the apparatus.

The present embodiment has been explained by a printing mechanism in which a photosensitive member 95 is scanned with a laser beam, modulated by the video signal, by means of a polygon mirror 94 rotated by the scanner motor 93, but the present invention is also applicable to an optical printer utilizing an LED array or a liquid crystal shutter.

For example in a LED printer utilizing an LED array, the LED's are arranged in the main scanning direction with a pitch corresponding to the dot density. Consequently, if there are required three different densities D1-D3 in the main scanning direction, three LED arrays are positioned around the photosensitive member and are suitably selected. The dot density in the sub scanning direction can be changed by the interval of lighting of the LED array, in relation to the rotating speed of the photosensitive member and the required dot density.

In the main scanning direction, the data read from the bit map memory 85 are latched in succession in a register corresponding to the LED array instead of the serial video signal, and the LED array is turned on when the data loading of a line is completed. Thus the data of a line have to be transferred into said LED array.

10TH EMBODIMENT

Figure 23:
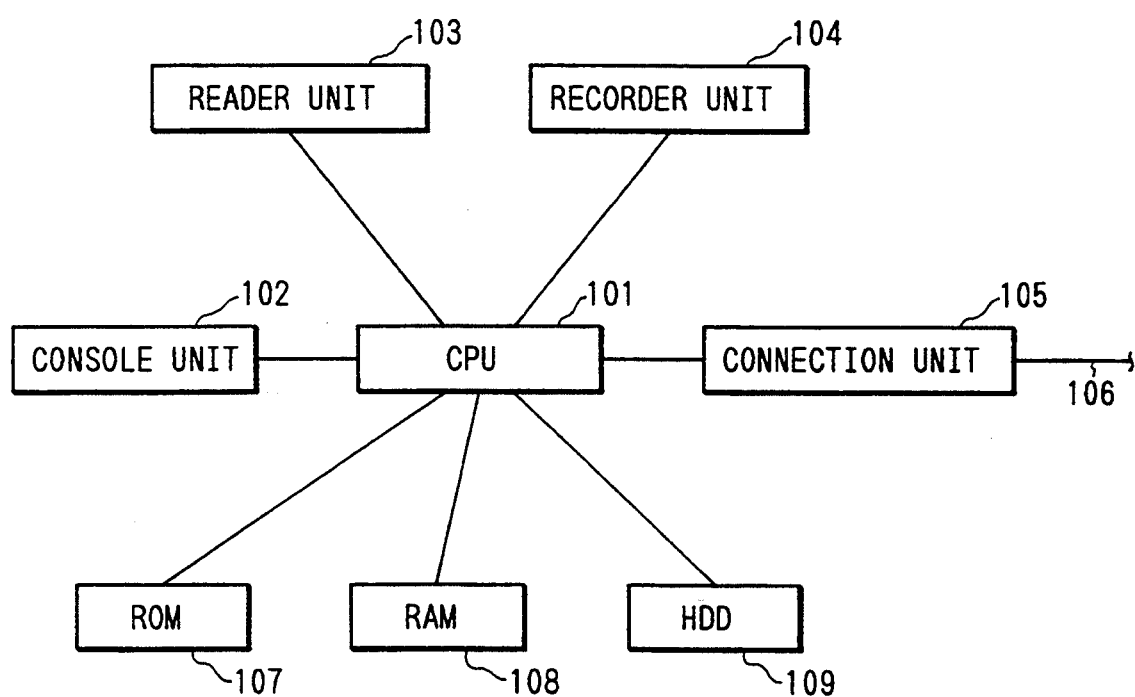
FIG. 23 is a block diagram of a facsimile apparatus constituting a tenth embodiment.

FIG. 23 is a block diagram of a facsimile apparatus constituting a 10th embodiment of the present invention.

In FIG. 23, a CPU 101 controls the facsimile apparatus and is composed for example of a microprocessor. In the facsimile apparatus there are provided a console unit 102; a reader unit 103; a recorder unit 104; a connection unit 105 such as a modem or a DSU, for connection with a communication network; a communication line 106; a ROM 107 storing the control program of the CPU 101; a RAM 108 for temporarily storing image data at various data processings; and a hard disk device 109 as an auxiliary memory for the image data.

Figure 24B:
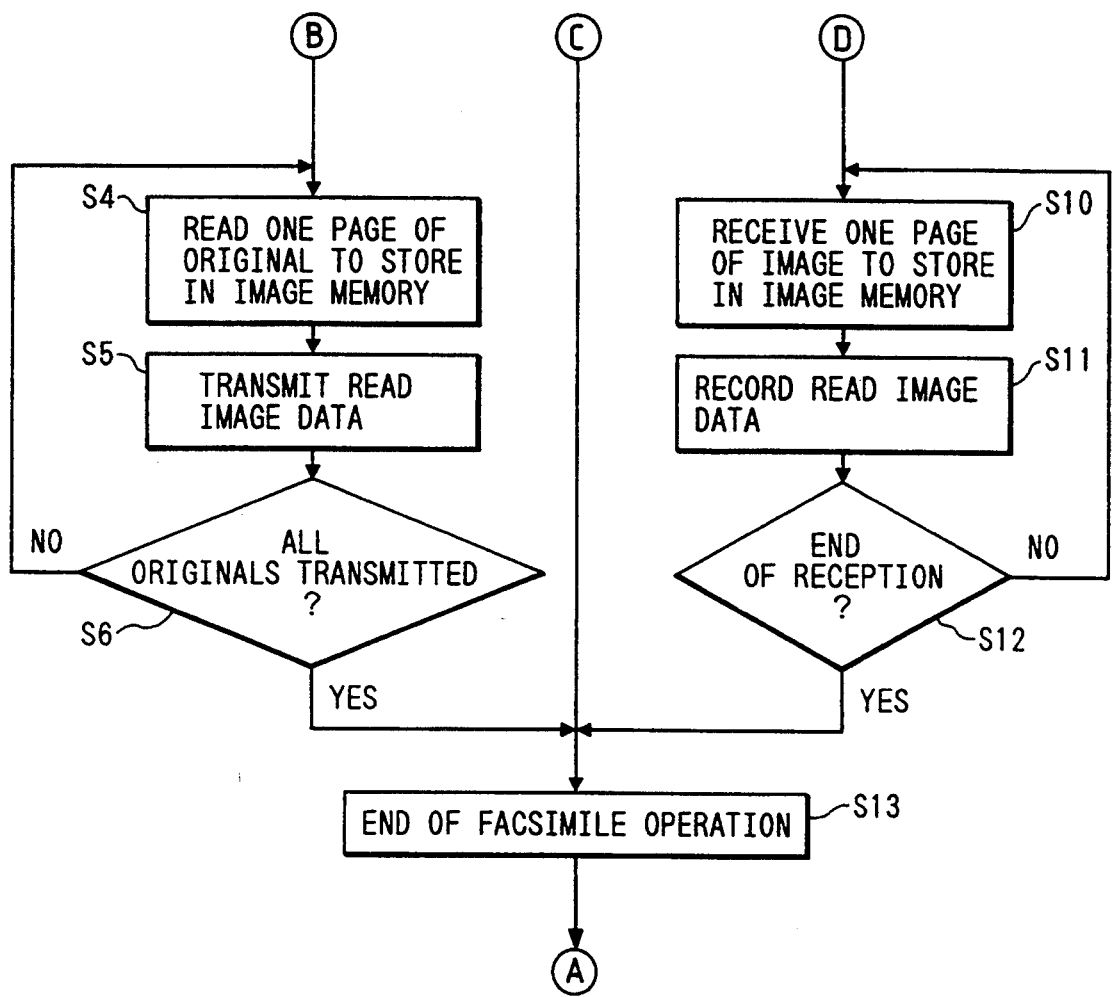

In the following there will be explained the basic function of the facsimile apparatus, with reference to FIG. 24.

In a stand-by state of the facsimile apparatus (step S1), if the start of function thereof is instructed (step S2), the operating mode is discriminated (step S3), and there is conducted a transmitting operation (steps S4-S6), a copying operation (steps S7-S9) or a receiving operation (steps S10-S12). After the completion of these operations (step S13), the apparatus re-enters the stand-by state (step S1). In the operation (S4–S12), the image data are temporarily stored in the RAM 108 functioning as a data buffer, and the data eventually overflowing the RAM 108 are transferred to the hard disk 109.

Figure 25:
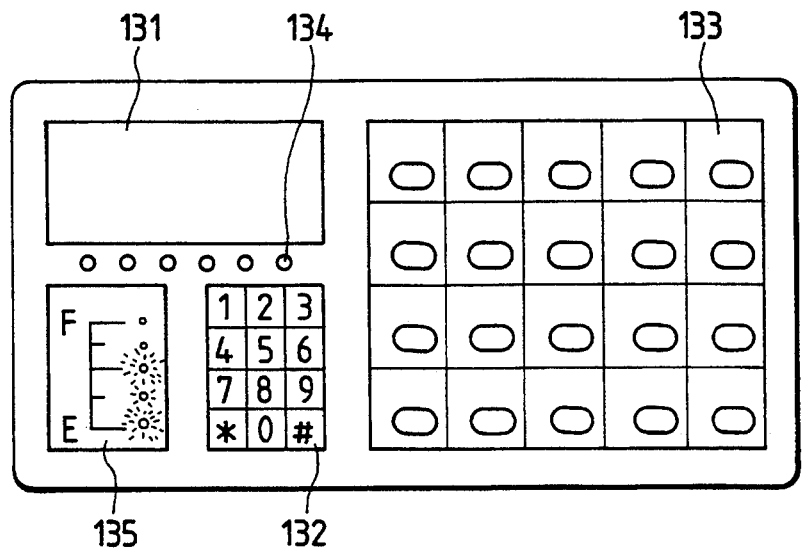
FIG. 25 is a view of an operation unit of the facsimile apparatus.

FIG. 25 is a detailed view of the console panel 102 of the facsimile apparatus, wherein provided are a display unit 131; ten-keys 132; one-touch keys 133; function keys 134; and a display unit 135 indicating the remaining amount of the recording sheet.

In the following explained is the basic function of the recorder unit 104, composed of a laser beam printer, of the present embodiment.

Figure 26:
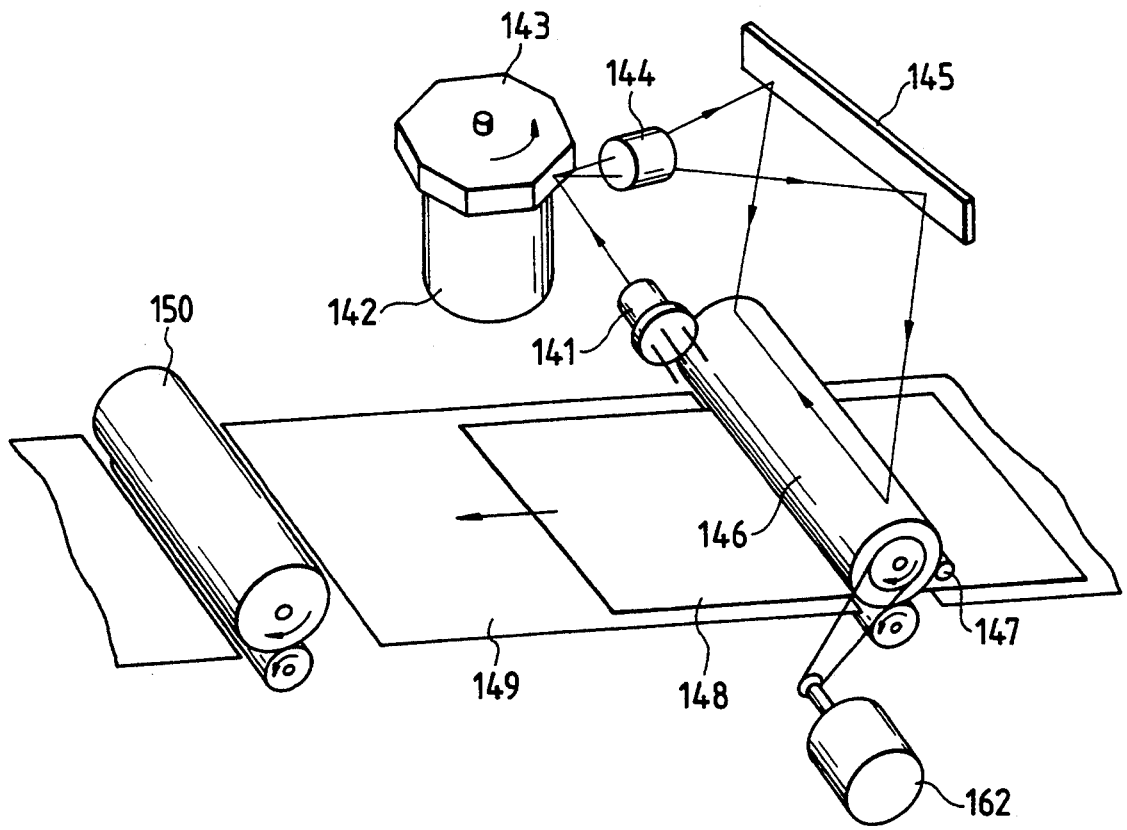
FIG. 26 is a schematic view showing the structure of a laser beam printer employed in the facsimile apparatus.

Referring to FIG. 26, there are provided a semiconductor laser 141 capable of turning on and off the laser beam corresponding to the white and black dots of the image data to be recorded; a polygon mirror motor 142; a polygon mirror 143 rotated by said motor 142; an imaging optical system 144 such as an f$\theta$ lens; a mirror 145; a photosensitive drum 146; a developing unit 147; a recording sheet 148; a conveyor belt 149; and fixing rollers 150.

The laser beam emitted from the semiconductor laser 141 is deflected by the rotary polygon mirror 143, and scans the photosensitive drum 146 by way of the optical system 144 and the mirror 145 (main scanning). During the main scanning of a line, the photosensitive drum 146 rotates by the line pitch (sub scanning). The image thus formed on the photo sensitive drum is developing in the developing unit 147, and is transferred onto the recording sheet 148, which is transferred by the conveyor belt 149 and fixed by the fixing rollers 150. The photosensitive drum 146, developing unit 147, conveyor belt 149 and fixing rollers 150, constituting the sub scanning system, are driven by a conveyor motor 162, through gears and belts.

In the following explained is the control on the image resolution of the printer.

At first the resolution in the main scanning direction is determined by the number of on-off dots of the semiconductor laser 141 during a scanning line of the laser beam by the polygon mirror 143. Thus the resolution can be varied (increased) by changing (increasing) the on-off speed of the semiconductor laser 141, or the rotating speed of the polygon mirror. On the other hand, the resolution in the sub scanning direction is determined by the amount of rotation of the photosensitive drum 146 during the main scanning time of a line. Consequently the resolution in the sub scanning direction can be varied (increased) by changing (increasing) the rotating speed of the motor 162 driving the photosensitive drum 146. For example, in order to obtain the resolutions, in the main and sub scanning directions, of Dx, Dy times of the default values, the main scanning is conducted by increasing the on-off speed of the semiconductor laser 141 to Dx times of the default value, while the sub scanning is conducted by reducing the rotating speed of the conveyor motor to 1/Dy of the default value. The values Dx, Dy are arbitrarily selectable but preferably within ranges not deteriorating the quality of the image recorded by the laser printer.

Figure 27:
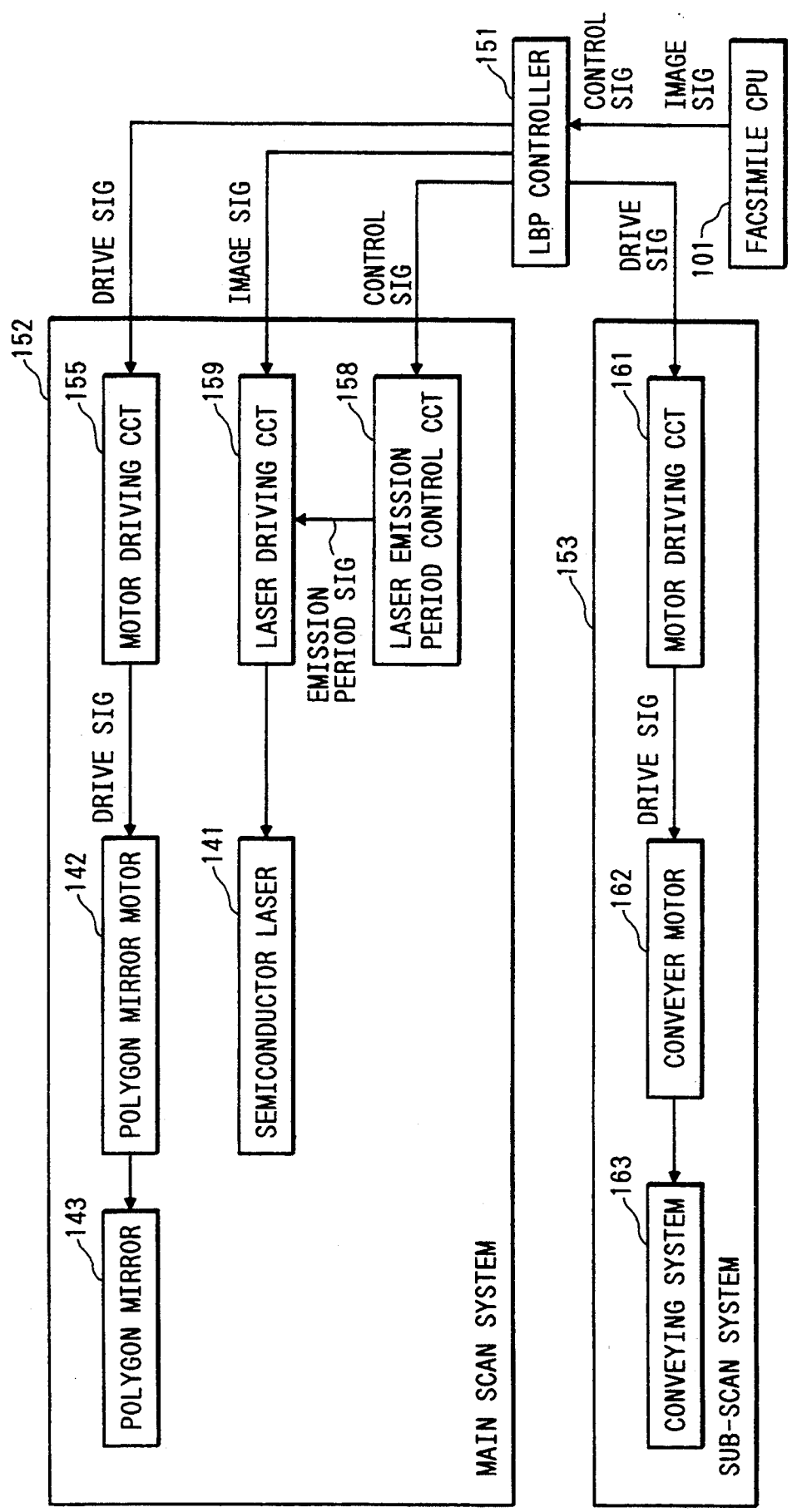
FIG. 27 is a block diagram of a control circuit of the laser beam printer shown in FIG. 26.

FIG. 27 shows an example of the control circuit for the above-explained laser printer.

A controller 151 controls a main scanning control unit 152 and a sub scanning control unit 153, based on control signals and image signals from the CPU 101 of the facsimile apparatus 101.

The main scanning control unit 152 is composed of a rotary polygon mirror 143 rotated by a motor 142, driven by the drive signal of a motor driving circuit 155, and a semiconductor laser 141 driven by a laser driving circuit 159, controlled by light interval signal and image signal of a laser emission interval control circuit 158. The sub scanning control unit 153 is composed of a conveying system 163 rotated by a motor 162 driven by driving signal of a motor driving circuit 161. When a signal for varying the resolution is given from the CPU 101 of the facsimile apparatus, the controller 151 sends, according to the instructed resolution, a signal for varying the interval of laser beam emissions to the control circuit 158 of the main scanning system, and a signal for varying the rotating speed of the motor 162 to the motor driving circuit 161 in the sub scanning system.

The recording resolution of the laser printer can be varied by the above-explained control.

Figure 28:
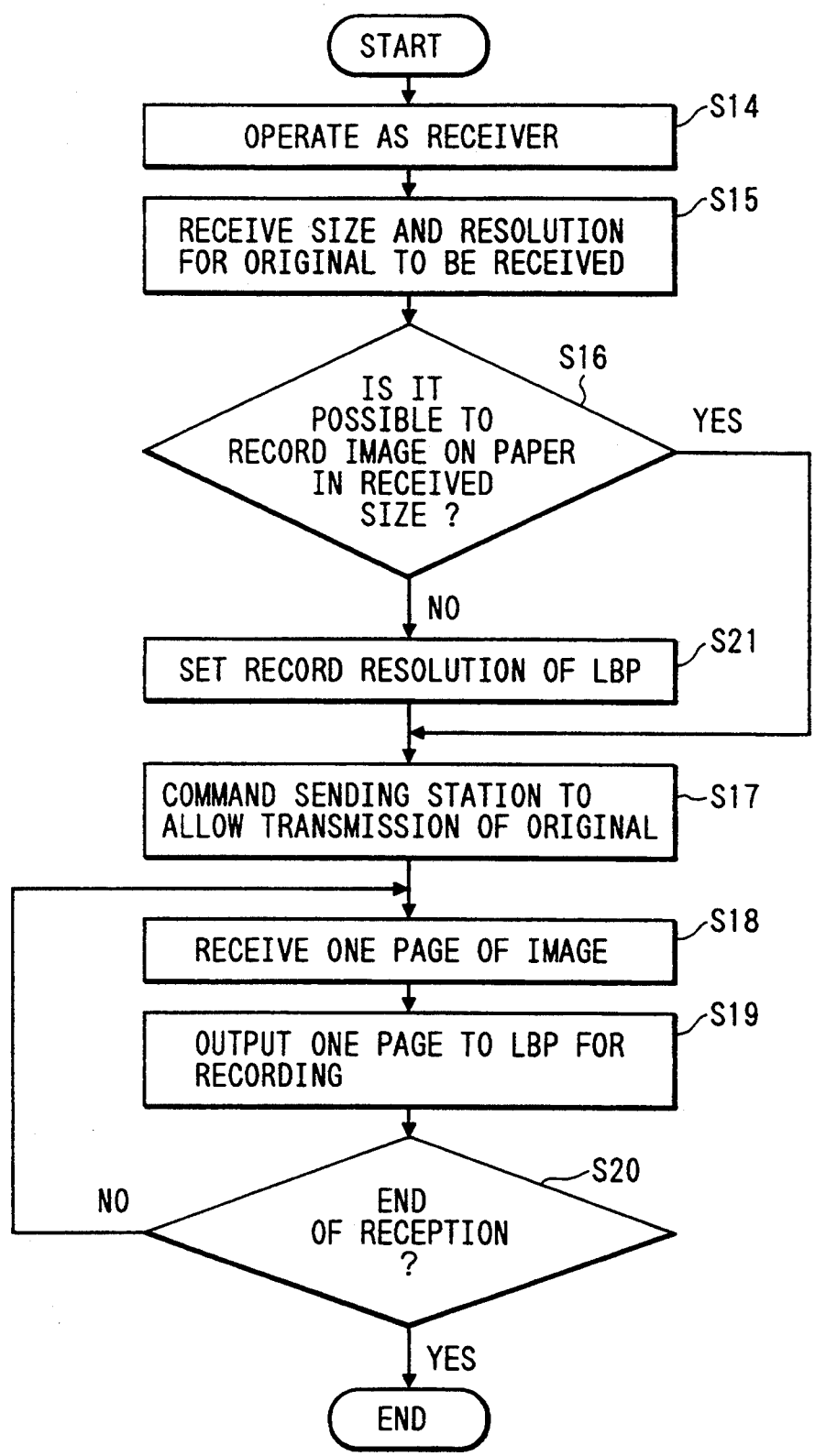
FIG. 28 is a flow chart of the control sequence of the principal parts of the facsimile apparatus of the tenth embodiment.

Now reference is made to FIG. 28 for explaining the function in receiving the image data.

Upon entering the receiving operation (S14), the facsimile apparatus receives the size and resolution of the original to be received (S15). If the size of said original to be received can be entirely recorded on the recording sheet (S16), a transmission command is sent to the transmitting unit to effect the transmission without change in the original size (S17). Thereafter ordinary receiving operation is conducted (S18–S20).

On the other hand, if the size of the original to be received requires size reduction for recording on the recording sheet (S16), the resolution of the laser printer is so controlled that the size of the original to be received is reduced to the size of the recording sheet (S21). Then a transmission command is sent to the transmitting unit to effect the transmission without changing the original size (S17), and thereafter normal receiving operation is conducted (S18–S20).

The setting of resolution of the laser printer in the above-explained control is conducted as follows.

If the original to be received is A3-size with a resolution of 200 dpi, and the recording sheet is A4-size, then the amount of information in a main scanning line is:

$$297 \text{ mm} \times 200 \text{ bits/inch} \div 25.4 \text{/inch} \cong 2339$$

bits. In order to accommodate this image information in a line of A4-sized sheet:

2339 bits×25.4 mm/inch÷210 mm≅283 bits/inch. Therefore the resolution should be increased to 283 dpi. Similarly the resolution in the sub scanning direction should be increased to 283 dpi. The required resolution can be calculated in a similar manner for other combinations sheet sizes.

The above-explained control of the resolution of the laser printer enables reduced recording without loss in the received amount of information.

In the above-explained embodiment the resolution is varied by the interval of light emissions of the semiconductor laser and the conveying speed of the sheet, but there may be utilized a change in the rotating speed of the polygon mirror. Also said control is applicable to a halftone image or a color image. Also if the shape of sheets is different, for example between the legal size and the letter size, it is possible to vary the resolutions in the main and sub scanning directions in respective ratios, or to reduce the image according to a larger reduction ratio in order to avoid the deformation of the image.

In the foregoing description the laser beam printer is employed as recording means, but, according to the spirit of the present invention, there may be employed other recording apparatus capable of varying the resolution in the main scanning direction, such as an ink jet printer, a wire dot printer or a thermal printer with a scanning head.

The present invention is not limited to the foregoing embodiments but is subject to various modifications within the scope and spirit of the appended claims.

What is claimed is:

1. A data processing apparatus for controlling a printer unit, the printing unit including scanning means for scanning a photosensitive body with modulated light, comprising:

code data input means for entering code data;

process means for processing the code data entered from said code data input means to generate dot image data;

sending means for sending the generated dot image data to the printer unit in order to generate modulated light for the scanning means;

signalling means for outputting a signal for instructing a scanning speed of the modulated light, wherein said sending means sends the generated dot image data at a sending speed determined in accordance with size data of a printing medium in the printer unit, and wherein said signalling means outputs the signal for instructing a scanning speed in accordance with the size data of the printing medium.

2. An apparatus according to claim 1, wherein said code data input means is capable of entering designation data for designating an area on which the image data generated from the code data is to be printed, wherein said sending means sends the generated dot image data at a sending speed determined in accordance with the size data of the printing medium and the designation data, and wherein said signalling means outputs the signal for instructing a scanning speed determined in accordance with the size data of the printing medium and the designation data.

3. An apparatus according to claim 1, wherein said printing unit is comprised by a laser beam printer.

4. An apparatus according to claim 3, wherein said scanning means includes a conveyance motor for conveying the printing medium, and wherein said scanning means changes a rotating speed of said conveyance motor on the basis of the signal outputted from said signalling means.

5. An apparatus according to claim 3, wherein said scanning means includes a rotatable polygonal mirror and wherein said scanning means changes a rotating speed of said rotatable polygon mirror on the basis of the signal outputted from said signalling means.

6. An apparatus according to claim 1, wherein said apparatus is comprised by a facsimile apparatus and wherein said code data input means enters size data of an image to be printed in accordance with the code data, wherein said sending means sends the generated dot image data at a sending speed determined in accordance with the size data of the printing medium and the entered size data, and wherein said signalling means outputs the signal for instructing a scanning speed in accordance with the size data of the printing medium and the entered size data.

7. An apparatus according to claim 1, wherein said code data input means enters size designating data for designating a size of the printing medium from host computer means, wherein said sending means sends the generated dot image data at a sending speed determined in accordance with the size data of the printing medium and the size designating data, and wherein said signalling means outputs the signal for instructing a scanning speed in accordance with the size data of the printing medium and the size designating data.

8. An apparatus according to claim 7, further comprising comparison means for comparing the size data of the printing medium to the size designating data, and wherein said signalling means outputs the signal for instructing a scanning speed in accordance with a comparison result by said comparison means.

* * * * *